US009279602B2

(12) United States Patent
Kennedy et al.

(10) Patent No.: US 9,279,602 B2
(45) Date of Patent: Mar. 8, 2016

(54) SYSTEM AND METHOD FOR PROVISIONING ENERGY SYSTEMS

(75) Inventors: Daniel Ian Kennedy, Oakland, CA (US); Adam Pryor, Paddington (AU); Andrew Birch, Orinda, CA (US)

(73) Assignee: SUNGEVITY INC., Oakland, CA (US)

( * ) Notice: Subject to any disclaimer, the term of this patent is extended or adjusted under 35 U.S.C. 154(b) by 843 days.

(21) Appl. No.: 12/681,375

(22) PCT Filed: Oct. 6, 2008

(86) PCT No.: PCT/US2008/079003
§ 371 (c)(1),
(2), (4) Date: Apr. 13, 2011

(87) PCT Pub. No.: WO2009/046459
PCT Pub. Date: Apr. 9, 2009

(65) Prior Publication Data
US 2011/0205245 A1    Aug. 25, 2011

Related U.S. Application Data

(60) Provisional application No. 60/977,592, filed on Oct. 4, 2007, provisional application No. 61/025,431, filed on Feb. 1, 2008, provisional application No. 61/047,086, filed on Apr. 22, 2008.

(51) Int. Cl.
*G06T 11/20* (2006.01)
*F24J 2/40* (2006.01)
(Continued)

(52) U.S. Cl.
CPC . *F24J 2/40* (2013.01); *G06Q 10/10* (2013.01); *G06Q 50/06* (2013.01); *F24J 2200/04* (2013.01); *Y02E 10/40* (2013.01)

(58) Field of Classification Search
USPC .......................... 345/440, 619, 629
See application file for complete search history.

(56) References Cited

U.S. PATENT DOCUMENTS 5,583,977 A * 12/1996 Seidl .............................. 345/619
6,047,274 A    4/2000 Johnson et al.
(Continued)

FOREIGN PATENT DOCUMENTS

CN    101294793 A    10/2008
EP    1 986 154        10/2008
(Continued)

OTHER PUBLICATIONS

Bartesaghi, Alberto, Three-dimensional shape rendering from multiple images, Graphical Models 2005 pp. 1-15, Elsevier, online at www.science direct.com.
(Continued)

*Primary Examiner* — M Good Johnson
(74) *Attorney, Agent, or Firm* — The Marbury Law Group PLLC

(57) ABSTRACT

The invention provides systems and methods for provisioning a site with an energy system such as a solar energy system. A system according to an embodiment of the invention comprises a user interface module providing a graphical user interface for receiving information from a user, for example a potential purchaser. The information includes location information for the site to be provisioned. An image retrieval module is coupled to the user interface module and to a source of geographical information. The image retrieval module retrieves at least one image of the site corresponding to the location provided by the user. A sizing module is configured to enable a user to measure an installation surface represented in the image. Energy system components are selected based on the measurements.

20 Claims, 13 Drawing Sheets

(51) Int. Cl.
  *G06Q 10/10*  (2012.01)
  *G06Q 50/06*  (2012.01)

(56) References Cited

U.S. PATENT DOCUMENTS

| | | | | |
|---|---|---|---|---|
| 6,065,255 | A * | 5/2000 | Stern et al. | 52/173.3 |
| 6,111,188 | A * | 8/2000 | Kurokami et al. | 136/244 |
| 6,426,745 | B1 * | 7/2002 | Isaacs et al. | 345/419 |
| 6,525,262 | B1 * | 2/2003 | Makita et al. | 136/244 |
| 6,534,702 | B1 * | 3/2003 | Makita et al. | 136/244 |
| 6,546,535 | B1 * | 4/2003 | Nagao et al. | 716/120 |
| 6,549,200 | B1 | 4/2003 | Mortlock et al. | |
| 6,628,279 | B1 * | 9/2003 | Schell et al. | 345/420 |
| 6,636,803 | B1 * | 10/2003 | Hartz et al. | 701/459 |
| 6,858,826 | B2 | 2/2005 | Mueller et al. | |
| 6,875,914 | B2 | 4/2005 | Guha | |
| 7,133,551 | B2 | 11/2006 | Chen et al. | |
| 7,238,879 | B2 | 7/2007 | Matsushita | |
| 7,271,377 | B2 | 9/2007 | Mueller et al. | |
| 7,303,788 | B2 | 12/2007 | Kataoka | |
| 7,305,983 | B1 | 12/2007 | Meder et al. | |
| 7,324,666 | B2 | 1/2008 | Zoken et al. | |
| 7,343,268 | B2 * | 3/2008 | Kishikawa | 703/1 |
| 7,376,284 | B2 * | 5/2008 | Tao et al. | 382/285 |
| 7,500,391 | B2 | 3/2009 | Woro | |
| 7,529,794 | B2 | 5/2009 | Dorai et al. | |
| 7,534,956 | B2 | 5/2009 | Kataoka | |
| 7,733,342 | B2 | 6/2010 | Kim et al. | |
| 7,749,351 | B2 | 7/2010 | Kataoka | |
| 7,787,659 | B2 | 8/2010 | Schultz et al. | |
| 7,832,267 | B2 | 11/2010 | Woro | |
| 7,844,499 | B2 | 11/2010 | Yahiro et al. | |
| 7,873,239 | B2 | 1/2011 | Yamaai | |
| 7,904,382 | B2 | 3/2011 | Arfin | |
| 7,991,226 | B2 | 8/2011 | Schultz et al. | |
| 8,078,436 | B2 * | 12/2011 | Pershing et al. | 703/2 |
| 8,145,578 | B2 * | 3/2012 | Pershing et al. | 705/400 |
| 8,160,400 | B2 | 4/2012 | Snavely et al. | |
| 8,249,902 | B2 | 8/2012 | Arfin et al. | |
| 8,315,912 | B2 | 11/2012 | Yahiro et al. | |
| 8,326,021 | B2 | 12/2012 | Kobayashi et al. | |
| 8,417,061 | B2 * | 4/2013 | Kennedy et al. | 382/286 |
| 2003/0071194 | A1 | 4/2003 | Mueller et al. | |
| 2004/0153371 | A1 | 8/2004 | Razumov | |
| 2006/0061566 | A1 | 3/2006 | Verma et al. | |
| 2006/0137736 | A1 | 6/2006 | Nishitani et al. | |
| 2006/0232605 | A1 * | 10/2006 | Imamura | 345/619 |
| 2006/0265287 | A1 * | 11/2006 | Kubo | 705/26 |
| 2007/0150198 | A1 * | 6/2007 | MacDonald | 702/2 |
| 2007/0150366 | A1 | 6/2007 | Yahiro et al. | |
| 2008/0162380 | A1 | 7/2008 | Suga et al. | |
| 2008/0262789 | A1 | 10/2008 | Pershing | |
| 2008/0267454 | A1 | 10/2008 | Kobayashi et al. | |
| 2009/0132210 | A1 * | 5/2009 | Royan et al. | 703/1 |
| 2009/0132436 | A1 * | 5/2009 | Pershing et al. | 705/400 |
| 2009/0177458 | A1 | 7/2009 | Hochart et al. | |
| 2009/0234692 | A1 | 9/2009 | Powell et al. | |
| 2009/0304227 | A1 | 12/2009 | Kennedy et al. | |
| 2010/0110074 | A1 | 5/2010 | Pershing | |
| 2010/0114537 | A1 | 5/2010 | Pershing | |
| 2010/0217565 | A1 | 8/2010 | Wayne | |
| 2010/0217724 | A1 | 8/2010 | Wayne | |
| 2011/0016017 | A1 | 1/2011 | Carlin | |
| 2011/0047048 | A1 | 2/2011 | Yahiro | |
| 2014/0015924 | A1 | 1/2014 | Pryor | |
| 2014/0032178 | A1 | 1/2014 | Kicinski et al. | |
| 2015/0066442 | A1 | 3/2015 | Pryor | |

FOREIGN PATENT DOCUMENTS

| | | |
|---|---|---|
| JP | 11-183172 | 7/1999 |
| JP | 2000236737 A | 9/2000 |
| JP | 2001-209680 | 8/2001 |
| JP | 2001-229262 | 8/2001 |
| JP | 2001209680 | 8/2001 |
| JP | 2001229262 | 8/2001 |
| JP | 2002163640 A | 6/2002 |
| JP | 2002-520969 | 7/2002 |
| JP | 2005-196321 | 7/2005 |
| WO | WO 00/04508 | 1/2000 |
| WO | WO 00/29806 | 5/2000 |
| WO | WO 2005/068936 A1 | 7/2005 |
| WO | WO 2007/127864 A2 | 8/2007 |
| WO | WO-2007127864 A2 | 8/2007 |
| WO | WO2009/046459 A8 | 8/2010 |
| WO | WO 2012/048304 | 4/2012 |
| WO | WO 2013/040016 A1 | 3/2013 |

OTHER PUBLICATIONS

Hudson, Thomas R., 'Merging VRML Models: Extending the Use of Photomodeller' Mar. 23, 1998, Thesis, School of Engineering and Applied Science, University of Virginia.
Oliver Faugeras "The Geometry of Multiple Images" 2001 United States ISBN 0-262-06220-8.
Japanese Office Action received in connection with related Japanese Application No. Tokugan2010-528219; dated Sep. 11, 2013 (3 pgs.).
English translation of Japanese Office Action received in connection with related Japanese Application No. Tokugan2010-528219; dated Sep. 11, 2013 (4 pgs.).
European search report received in connection with European application No. EP08836170.4, dated Jan. 15, 2014.
Australian office action received in connection with Australian Application No. Au appln. 2008309133, dated Apr. 20, 2012.
International Preliminary Report on Patentability and written opinion received in connection with international application No. PCT/US2008/079003; dated Dec. 5, 2008.
International Search Report received in connection with international application No. PCT/US2008/079003; dated Dec. 5, 2008.
Letter re Mexican Office Action received in connection with Mexican application No. MX/a/2010/003682; dated Nov. 20, 2013 (redacted).
Hendrickx et al., "3D Reconstruction of House Roofs from Multiple Awriai Images of Urban Areas"IAPRS, vol. 32, Part 3-4W, pp. 88-95 (1997).
Matthews, N. A., "Aerial and Close-Range Photogrammetric Technology: Providing Resource Documentation, Interpretation, and Preservation" (2008).
Written Opinion received in connection with international application No. PCT/US2011/055489; dated Feb. 8, 2012.
International Search Report received in connection with international application No. PCT/US2011/055489; dated Feb. 8, 2012.
Pershing et al., U.S. Appl. No. 60/925,072, "Aerial roof estimation system and method", filed Apr. 17, 2007.
Pryor, A., U.S. Appl. No. 61/391,069, "Rapid 3D Modeling", filed Oct. 7, 2010.
Japanese Patent Office, Office Action, Japanese Application No. 2010-528219, 5pgs., issued Aug. 25, 2014.
Chinese Office Action received in connection with Chinese Application No. 201180048808.1; dated Mar. 20, 2015 (with partial English translation).
Korean Office Action received in connection with Korean Patent Application No. 10-2010-7008197; dated Jul. 17, 2015.
English Translation of Korean Office Action received in connection with Korean Patent Application No. 10-2010-7008197; dated Jul. 17, 2016.
International search report and written opinion received in connection with international application No. PCT/US2014/053121; mailed Dec. 10, 2014.
Mexican Office action, Mexican Application No. MX/a/2014/008214 issued Nov. 27, 2014, with informal translation dated Feb. 6, 2015 (redacted letter).
Mexican Office action, Mexican Application No. MX/a/2013/003853; issued Apr. 25, 2014 with informal translation dated Jun. 30, 2014 (redacted letter).
Subsequent Substantive Examination Report received in connection with Philippine Application No. 1/2010/500721; mailed Jul. 22, 2015.

(56) References Cited

OTHER PUBLICATIONS

Mexican Office Action received in connection with Mexican Application No. MX/a/2014/008214; dated Apr. 24, 2015 (with redacted letter as informal translation).
Canadian Office Action and search report received in connection with Canadian Application No. 2,701,645; dated Mar. 19, 2015.
Invitation to respond to the written opinion and search report received in connection with Singapore patent application No. 2013025572; dated Jun. 27, 2014.
Patent Examination Report received in connection with Australian Patent Application No. 2011312140, dated Sep. 17, 2014.
Examination report received in connection with Philippine Application No. 1/2010/500721; dated Sep. 17, 2014.
Letter re Mexican Office Action received in connection with Mexican Application No. MX/a/2010/003682; dated Mar. 12, 2014 (redacted).
Patent Examination Report received in connection with Australian Patent Application No. 2014202326, dated Aug. 10, 2015.
GeoTango Releases SilverEye 2.3, webpage found at http://www.directionsmag.com/pressreleases/geotango-releases-silvereye153-23/107384; downloaded Sep. 18, 2015.
GeoTango International, "GeoTango International Releases SilverEye V2.0", Design, CMS, Hosting & Web Development: ePublishing, Mar. 31, 2004.
Woro, "Solar Census", Provisional U.S. Appl. No. 60/796,033, filed Apr. 27, 2006.
Powell et al., "Method and System for Configuring Solar Panel Systems", Provisional Appl. No. 61/069,279, filed Mar. 13, 2008.

* cited by examiner

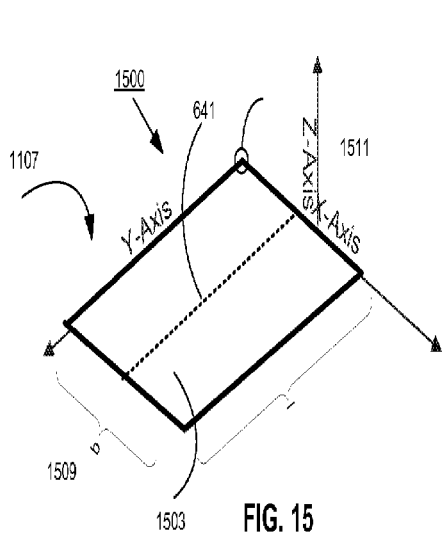
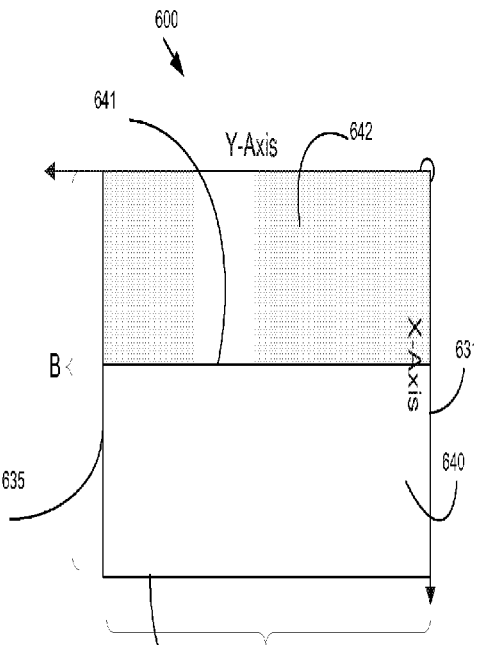
FIG. 15
FIG. 14
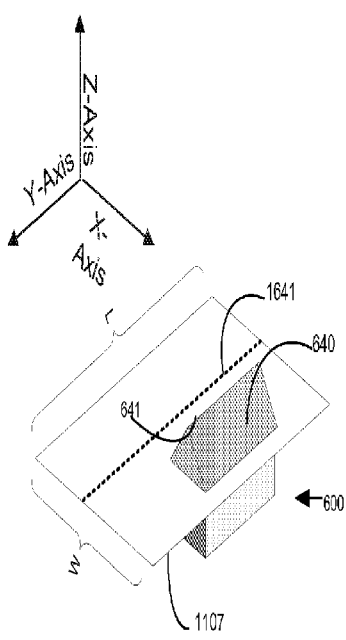
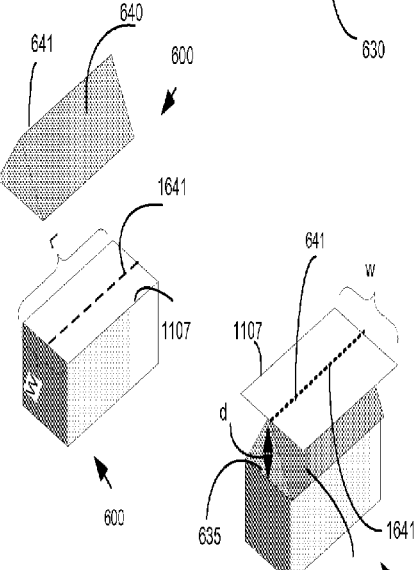
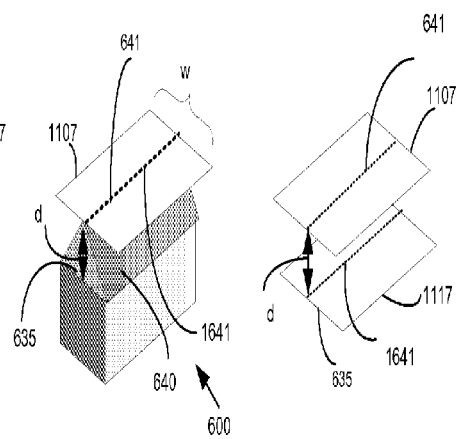
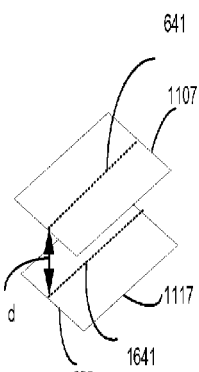
FIG. 16    FIG. 17    FIG. 18    FIG. 19

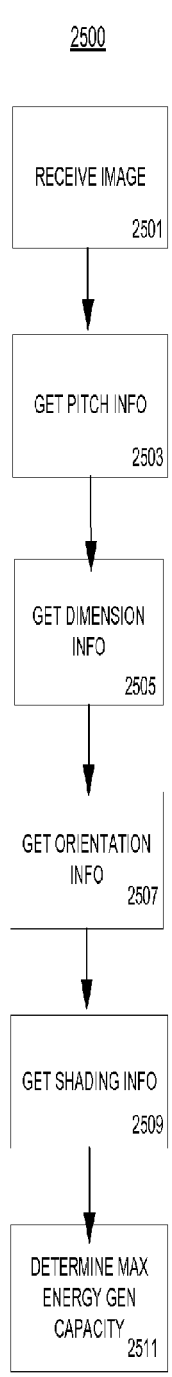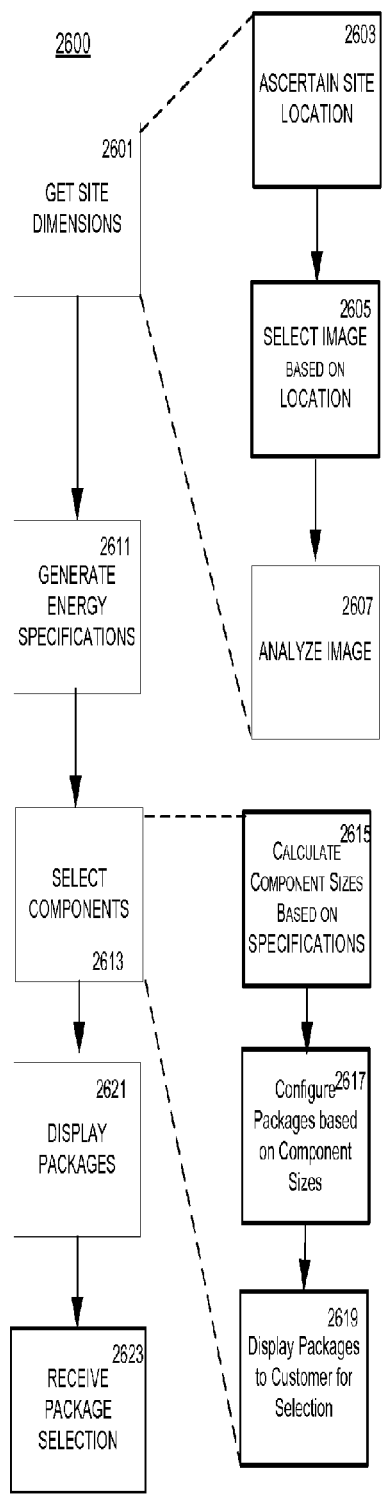
FIG. 25                    FIG. 26

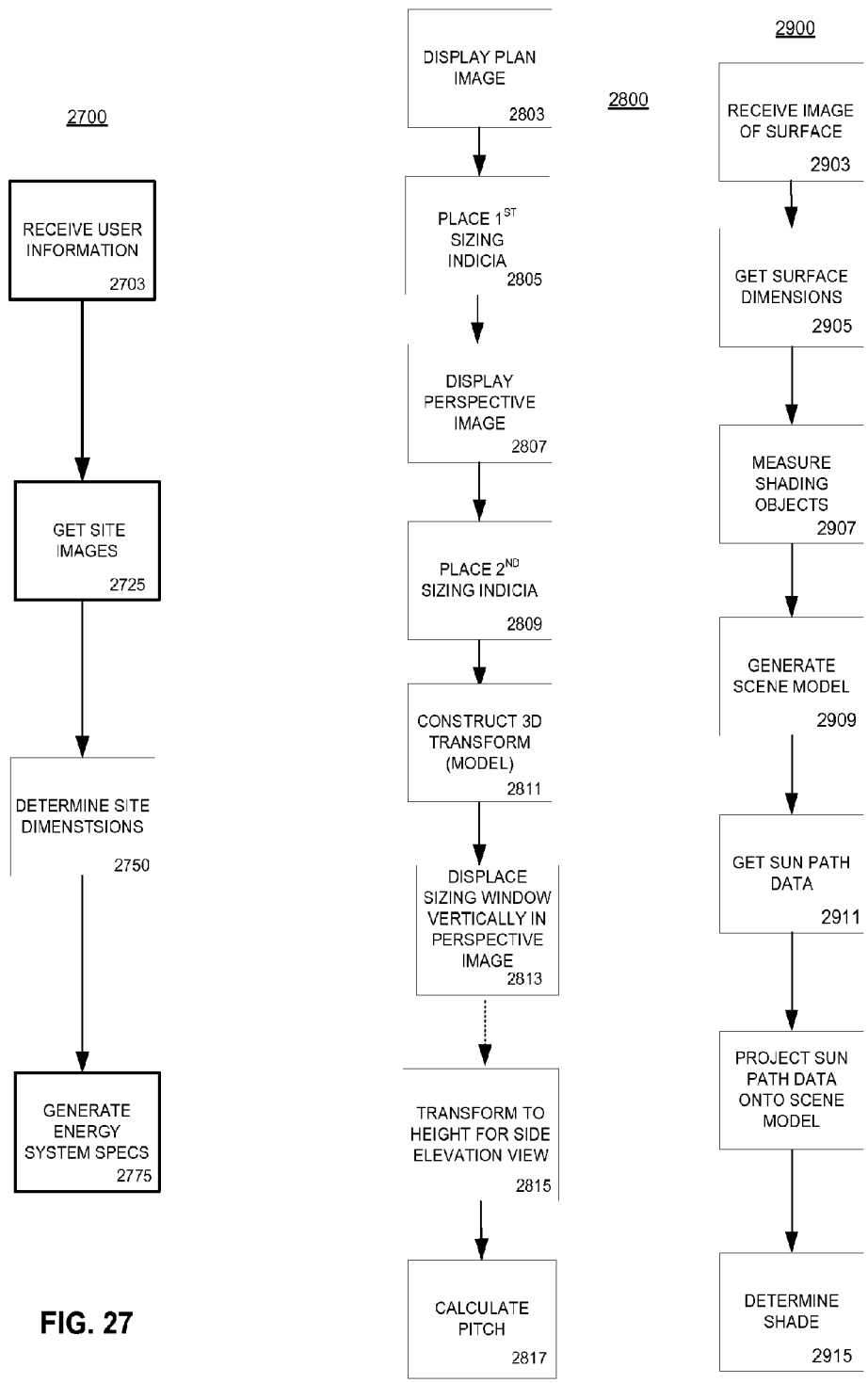

SYSTEM AND METHOD FOR PROVISIONING ENERGY SYSTEMS

CROSS REFERENCE TO RELATED APPLICATIONS

This application claims the benefit of filing date of U.S. provisional application Ser. No. 60/977,592 titled, System And Method For Provisioning A Solar Energy System, filed on Oct. 4, 2007 in the USPTO; U.S. provisional application Ser. No. 61/025,431 titled System And Method For Sizing A Roof For Installation Of Solar Panels filed on Feb. 8, 2008 in the USPTO; and to U.S. provisional application Ser. No. 61/047,086 titled Customer Relationship Management Module, Marketing Module, Quick Sizing filed on Apr. 22, 2008 in the USPTO.

FIELD OF THE INVENTION

The present invention relates generally to methods and systems for provisioning energy systems and in particular to methods and systems for provisioning solar energy systems.

BACKGROUND OF THE INVENTION

Environmental and cost concerns associated with traditional energy systems are increasing in today's energy conscious society. Concerns about oil and natural gas prices, and environmental concerns highlighted by recent hurricanes and other natural disasters have focused attention on alternative energy sources and systems.

So called 'clean energy' offers much hope for alleviating today's energy concerns. For example, today's solar technologies provide significant economic and environmental advantages for homeowners. Deployment of solar technologies is widely encouraged through financial incentives offered by local, regional as well as federal energy rebate programs.

Yet, despite these advantages and incentives many homeowners remain reluctant to convert from conventional fuel based systems to advanced solar and other alternative energy technologies. Part of the reluctance stems from the time, expertise and cost associated with converting from a conventional energy system to an alternative energy system such as a solar energy system. The current marketplace does not offer consumers sufficient information about costs and benefits of energy systems to allow a potential purchaser to make an informed choice when considering alternative energy systems.

For example, sizing a homeowner's particular roof-space including all the relevant features of that particular roof space typically requires an on-site visit by a technician. Further, it is presently not possible to remotely evaluate shading issues or other local factors that might impact the performance of a particular system. Nor is it possible for potential purchasers to visualize a system as it would appear installed on the purchaser's actual roof. As a result, information available to a purchaser about engineering requirements, aesthetic results, cost and environmental impact of a system considered for purchase is limited.

What are needed are systems and methods that provide consumers, contractors, third party vendors and others with convenient, comprehensive and site-specific information for use in provisioning a site with a solar energy system. Further needed are systems and methods that provide a potential purchaser with site specific information related to energy system costs, benefits and aesthetics of alternative energy systems.

SUMMARY OF THE INVENTION

The invention provides consumers, private enterprises, government agencies, contractors and third party vendors with tools and resources for gathering site specific information related to purchase and installation of energy systems.

DESCRIPTION OF THE DRAWING FIGURES

These and other objects, features and advantages of the invention will be apparent from a consideration of the following detailed description of the invention considered in conjunction with the drawing figures, in which:

FIG. 14 is a top plan view of the roof illustrated in FIG. 11.

FIG. 15 is a perspective view of the measurement tool illustrated in FIG. 11.

FIGS. 16-19 illustrate positioning of the measuring tool of FIG. 11 with respect to the roof illustrated in FIG. 11 for various orientations of a roof image.

FIG. 25 is a flowchart illustrating steps of a method for providing energy system specifications according to an embodiment of the invention.

FIG. 26 is a flowchart illustrating steps of a method for configuring component packages according to an embodiment of the invention.

FIG. 27 is a flowchart illustrating steps of a method for generating energy system specifications according to an embodiment of the invention.

FIG. 28 is a flowchart illustrating steps of a method for determining pitch according to an embodiment of the invention.

FIG. 29 is a flowchart illustrating steps of a method for determining shading for an installation surface according to an embodiment of the invention.

DETAILED DESCRIPTION OF THE INVENTION

Provisioning Systems and Methods

Definitions

The term "PV cell" refers to a photovoltaic cell, also referred to as solar cell.

The terms "PV Module" and "solar panel" and 'solar tile' refer to various arrangements of interconnected assemblies of photovoltaic cells.

The term "PV Array" refers to a plurality of interconnected solar panels or tiles.

The term 'provisioning' refers to providing, supplying, equipping, installing, or preparing to provide, supply, equip or install energy systems and energy system components for delivering energy to a site.

Figure 1:
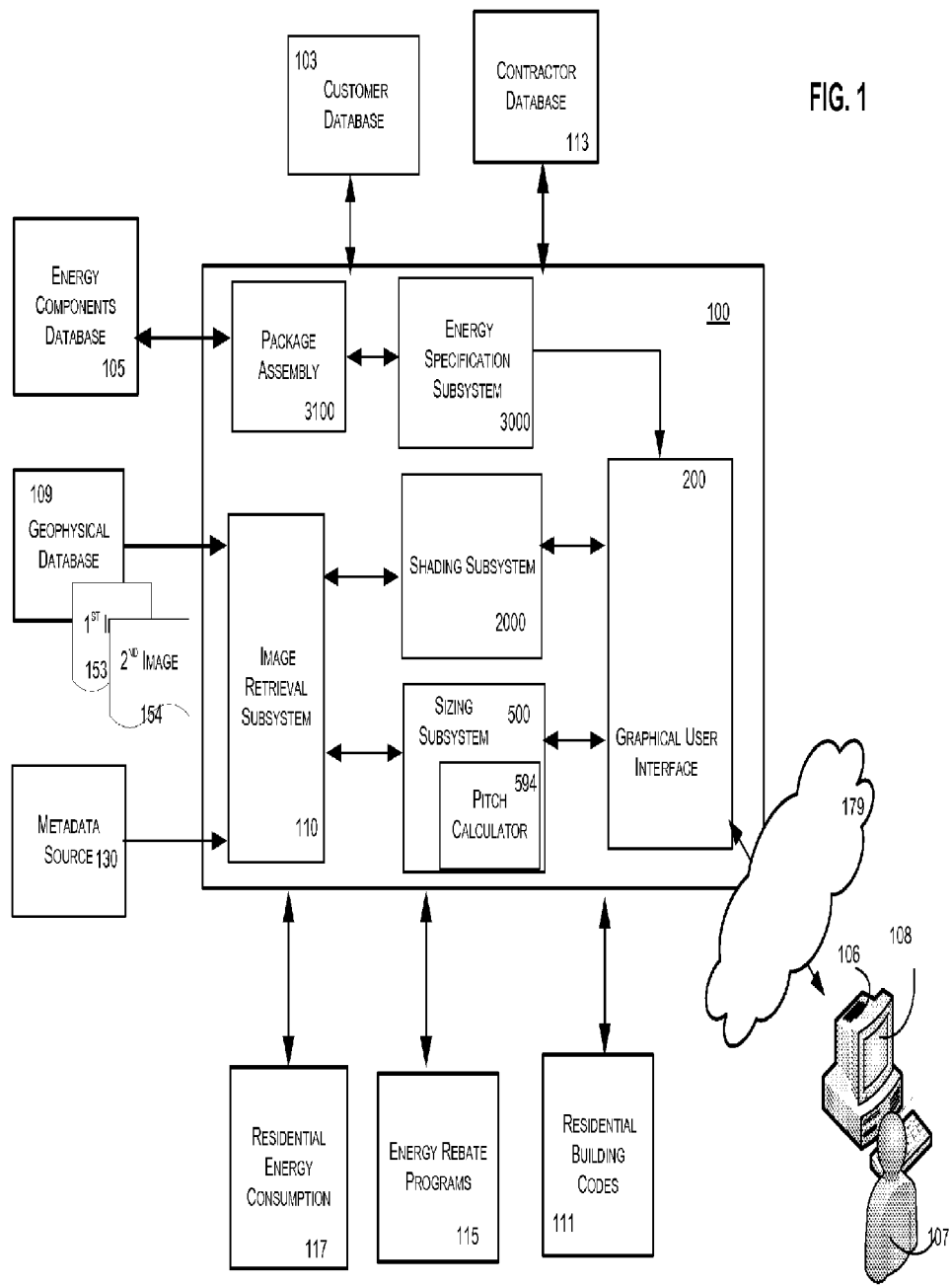
FIG. 1 is a high level block diagram illustrating a system for provisioning energy systems according to an embodiment of the invention.

FIG. 1 Provisioning System

FIG. 1 illustrates a provisioning system 100 according to an embodiment of the invention. System 100 and methods of the invention will find application in provisioning energy systems, for example, solar energy systems and other alternative energy systems. Solar energy systems include off-grid systems and grid tie systems. Off grid systems include stand-alone systems designed for homes, recreational vehicles, cabins, and backup and portable power applications. Systems and methods of the invention are also suitable for provisioning grid-tie systems. Further embodiments of the invention are suitable for provisioning hybrid off-grid systems, including systems integrating gasoline, propane or diesel generator power sources with other energy systems.

System 100 enables a user, for example user 107, to undertake efficient, cost effective and accurate execution of numerous phases of an energy system provisioning processes without the need for visits to the site to be provisioned. For example system 100 provides a tool for measuring a user selected roof or other user-selected other installation surface. One embodiment of the invention provides a sizing system for determining solar photovoltaic (PV) potential of a user selected installation site. System 100 matches user selected roof space and energy needs to commercially available system components without the need for visits to the user selected installation site by a technician or engineer.

System 100 comprises a graphical user interface module 200 and at least one of an energy specification subsystem 3000, a sizing subsystem 500 including a pitch calculator 594, a shading subsystem 2000, an image retrieval subsystem 110 and a package assembly subsystem 3100. Various embodiments of system 100 are configured to further communicate with at least one of a plurality of energy system related databases, for example, contractor database 113, customer database 103, energy components database 105, metadata source 130, residential energy consumption information database 117, energy rebate program information database 115 and residential building code database 111.

Embodiments of system 100 as disclosed and enabled herein are implementable using commercially available hardware. For example a commercially available processor or computer system adapted in accordance with the teachings herein implements system 100 including at least one of subsystems 110, 2000, 3000, 3100, 500 and/or 200. For example, one of ordinary skill in the art will recognize upon reading this specification, that commercially available processors, memory modules, input/output ports and other commercially available hardware components are suitable for use in constructing embodiments of system 100. These may be assembled as taught in this specification to arrive at the various embodiments.

Further, the teachings contained in this specification are implementable in a variety of combinations of hardware and software components. Where appropriate, flowcharts and detailed descriptions are provided herein to enable one of ordinary skill in the art to implement the features and functions of embodiments of the invention. In addition, some embodiments of the invention are configured for communication between system 100 and databases 111-130 via wired or wireless Internet or other network communication links. Other embodiments of the invention are configured for wireless or wired internet communication between subsystems of system 100.

Graphical User Interface (GUI) 200

Figures 2, 3, 4:
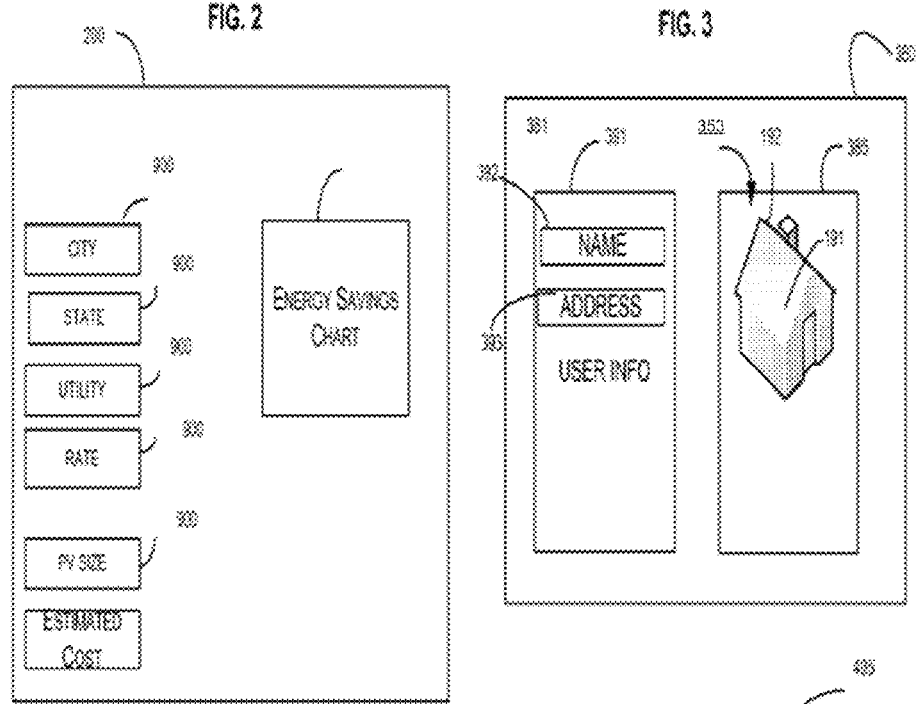
FIG. 2 illustrates a Graphical User Interface (GUI) for displaying energy system information to a user.
FIG. 3 is GUI enabling a user to provide address information for an installation site.
FIG. 4 illustrates a display screen providing a graphical indication of energy savings and an image of a solar energy system installed on a user specified installation surface according to one embodiment of the invention.

System 100 implements a graphical user interface (GUI) that enables a user 107 to interact with system 100 and its subsystems. According to some embodiments of the invention GUI 200 is implemented by a server providing a website and serving interactive web pages for gathering information and providing calculation results, images and other energy system information to user 107. FIG. 3 illustrates an example GUI as presented on a display device 108 of a user system 106 (illustrated in FIG. 1). Display device 108 displays a screen 380 to user 107. At least a portion 381 of display screen 380 is configured to receive user information, for example, name 392, address 393 or other site location information from user 107.

Referring now to FIG. 1, system 100 receives user provided information related to location of a site to be provisioned with solar energy capability. GUI 200 provides the user provided information to system 100. System 100 uses the information to retrieve an image 353 of the site from a geophysical database 109 (database 109 illustrated FIG. 1). System 100 provides the image, for example an image of a roof of a house 391 for display on screen 380 of display device 108 of a user system 106.

Embodiments of system 100 enable a user 107 to interact with system 100 to determine, at least partly automatically, information related to size of an installation area of a site. FIG. 3 illustrates a GUI 381 as displayed on a display screen 380 of a display device 108 of a user system 106. GUI 381 enables user 107 to provide location information, for example, address 393 of a user-selected site. System 100 provides an image 353 of the user selected site based on the location information. GUI 381 cooperates with sizing subsystem 500 of system 100 to implement a sizing tool enabling user 107 to determine surface dimensions and pitch of a surface based on image 353. Thus there is no need to physically visit the installation site to make measurements and perform sizing calculations.

Image Retrieval Subsystem 110

Returning now to FIG. 1 an image retrieval subsystem 110 communicates with a source of images 109. As used herein the term 'images' refers to photographic images and also to data and electrical signals representing photographic image information. The term 'images' also refers to data comprising other types of images such as still video images, video frames and fields of motion video images. A variety of image types and formats are suitable for use in system 100. Suitable image formats include standard file formats containing satellite or aerial photography (such as JPG, GIF, PNG etc) and also images served through a tile-server, whereby a single image is broken into multiple tiles which are joined to form the full image. Furthermore, these images may also be generated from other data sources, such as vector shapes, 3D (CAD) files and others rather than satellite or aerial photography In one embodiment of the invention source of images 109 comprises a geographical image database providing, for example, images 153 and 154. In one embodiment of the invention images 153 and 154 comprise digital data corresponding to images comprising satellite photographs. In some embodiments of the invention images 153 and 154 comprise images uploaded to source 109 by a third party, for example, a homeowner, a site manager, and images otherwise provided to source 109 by a user of system 100. In other embodiments of the invention, sources of images 109 include locally stored images.

In one embodiment of the invention images of geographic regions comprising potential sites to be provisioned with an energy system are obtained, for example, by satellite or aerial photography. The images are coded using image geo-coding software and stored in a memory, for example geographical database 109. Geo coding refers to a process of finding associated geographic coordinates (typically expressed as latitude and longitude) from other geographic data, such as street addresses, or zip codes. With geographic coordinates the features can be mapped and entered into Geographic Information Systems, or the coordinates can be embedded into media such as digital photographs via geo tagging.

Reverse Geo coding refers to finding an associated textual location such as a street address, based on geographic coordinates. A geo coder is software or a (web) service that implements this process. Some embodiments of the invention rely on a reverse geo coder to obtaining site addresses based on geographic coordinates. The geographic coordinates are determined, for example, by examining geo coded images including sites of interest for provisioning energy systems. One embodiment of the invention employs a Geographic Information Service (GIS) such as Google Earth™ comprising image source 109.

In one example embodiment of the invention image source 109 includes an image of a site considered for provisioning with an energy system wherein the site comprises at least one building structure, e.g., a house. The at least one image of the site represents a plan view, for example a top or bottom plan view, of a roof of the building. In some embodiments of the invention image source 109 includes at least one perspective image of a roof for installation of a solar energy system. In an example embodiment image retrieval subsystem 110 is configured to receive a first image 153 comprising a plan view of the roof and a second image 154 comprising a perspective view of the roof.

Sizing Subsystem 200—Pitch Calculator 294

System 100 includes a sizing subsystem 500 including a pitch calculator 594. Sizing subsystem 500 is coupled for communication with image retrieval subsystem 110 and GUI 200. Image retrieval subsystem 110 is coupled for communication, for example, via the Internet 179, with a least one source of images 109. Image retrieval module 110 is configured to provide at least one image 153 of a site to be provisioned.

GUI 200 cooperates with sizing subsystem 500 to implement a sizing tool enabling user 107 to determine surface dimensions and pitch of a surface without the need to physically visit the installation site to make measurements and perform sizing calculations. In response to receiving user information data, geophysical data including at least one image is downloaded from a source of geophysical data 109. The downloaded geophysical information is selected based on information provided by the user. For example, in the case wherein user 107 is a customer considering purchase of an energy system, user-provided information includes, for example, an address of a home to be provisioned with an energy system. In that case, an image of the user's home, including a view of the user's roof is downloaded from source of images 109. In one embodiment of the invention system 100 provides at least a portion of the downloaded image for display to user 107 on a display device 108 of a user's system 106.

User 107 interacts with system 100 and sizing subsystem 500 via GUI 200 to measure portions installation areas included in displayed images. The measurements are provided to a pitch calculator 594. Pitch calculator 594 determines pitch of a surface, for example, roof pitch, based on the image measurements made by user 107. Alternative embodiments of the invention determine pitch of other installation surfaces, for example, installation platforms not associated with a building and ground based installation surfaces based on measurements made automatically by sizing subsystem 500.

Shading Subsystem 2000

In one embodiment of the invention image retrieval subsystem 110 provides at least one downloaded image 153, 154 to shading subsystem 2000. In one embodiment of the invention shading subsystem 2000 communicates with user system 106 via GUI 200 to enable user 107 to interact with the downloaded image to identify shading objects impacting sun access of an installation surface. In other embodiments of the invention user interaction is not relied upon to identify shading objects. Instead, system 100 implements image analysis techniques to identify shadows in an image and to generate shading data based on the shadow information in the image.

Energy Specification Subsystem

An energy specification subsystem 3000 is coupled for communication with sizing subsystem 200. In some embodiments of the invention, energy specification subsystem 3000 is further coupled for communication with shading subsystem 500. Energy specification subsystem 3000 receives sizing information from sizing subsystem 500. In some embodiments of the invention energy specification subsystem 3000 receives shading information from shading subsystem 2000. Energy specification subsystem provides energy system specifications for a site represented in a downloaded image based on the sizing and shade information.

In some embodiments of the invention, energy specification subsystem 3000 is coupled for communication with a package assembly module 3100 Package assembly module 3100 is coupled for communication with a source of energy system component information, for example, an energy components database 105.

Package Assembly Module 3100

Package Assembly Module 3100 is configured to communicate with at least one of a component database 105 and a rebate program database 115. Package assembly module includes calculator module (not shown). Package assembly module generates at least one package comprising solar energy components suitable for installation at the consumer's site. To do this, package assembly module evaluates at least some of the following information: information about energy to be supplied by a solar energy system provided by sizing module 500: results of roof pitch, roof area, shading and other calculations.

Package assembly module 3100 communicates with component database 105 to determine suitable component selections to comprise package offerings for the consumer. Package assembly module obtains information about component prices and availability from database 105. Based on this information package assembly module 3100 generates at least one package comprising suitable components for a solar energy system for the consumer's site. Information about the package, including price information is provided by package assembly module 3100 to consumer system 106 via user interface module 200. The information is displayed on a consumer display 106 to allow the consumer to select a package for purchase package assembly module receives the consumer's package selection External Databases System 100 comprises system interfaces for communicating with external databases and sources of information relating to energy systems. For example, embodiments of the invention are configured to communicate with and receive data from geophysical database 109, residential energy consumption database 117, energy rebate database 115 and building code database 111

Some embodiments of the invention include a contractor database 113. In that case, contractor database 113 stores information, including for example, contractor location, qualifications, availability etc. related to contractors and installation support personnel. In that manner some embodiments of system 100 enable a user 107 to interact with GUI 200 to select a contractor to install an energy system procured using system 100. According to an embodiment of the invention solar energy system installers, for example, electricians or electrical contractors are provided with on line training in sales, customer service and system maintenance. Some embodiments of the invention include a capability to automatically dispatch trained installers and sales personnel to customer's homes when a customer requests a face-to-face discussion.

After an installation is completed, some embodiments of systems and methods of the invention store a customer's information in customer database 103. According to some embodiments of the invention an internet connection to a wireless output of a customer's energy inverter (for example equipped with a meter) will gather, analyze and display an installed energy system output and savings (financial and environmental). According to some embodiments of the invention recurring and on-demand site visits are automatically scheduled to maintain, clean and service a customer's system after an installation.

Information related to rebates for using alternative energy platforms is provided by energy rebate program database 115. In that case system 100 communicates with database 115 to factor financial incentives into cost calculations for a specific user selected site.

Thereby embodiments of the invention provide direct selling, remote automatic sizing and delivery of energy systems. The invention further provides methods that decrease the cost and increase the ease by which customers' access energy system information.

FIG. 27 is a flowchart illustrating steps of a method for provisioning energy systems according to an embodiment of the invention. At step 2703 Information about a site to be provisioned is received. In one embodiment of the invention a user, for example, a potential purchaser of an energy system, accesses a website implementing a system and method of the invention using, for example, a personal computer. A webpage of the website prompts the user to provide information to be used for provisioning a solar energy system to the user.

In one embodiment of the invention information about a site is received from a user, for example a homeowner, who may be considering installation of a solar energy system on a roof of a home. In other embodiments of the invention information about a site to be provisioned is provided by a vendor, an agent a commercial planner or other party desiring information about energy systems for a site. Examples of information received at step 2703 for a user/homeowner include such data as zip code, age of the home, square footage of the home, number of occupants and energy bill totals for a consecutive 12-month period. Various embodiments of systems and methods of the invention use this information, at least in part, to determine energy requirements of a home.

In response to receiving the user information data, geophysical data is downloaded from a source of geophysical data at step 2725. The downloaded geophysical information is determined based on the information provided by the customer. The geophysical information includes, for example, an image of the customer's residence including a view of the customers roof. In one embodiment of the invention the image is obtained using a satellite image geo-coding software. One embodiment of the invention employs a GIS service (for example Google Earth™) to obtain images to locate and view properties. In other embodiments of the invention only one image is retrieved from a source of images. In other embodiments of the invention, for example, for embodiments relying on 3-dimensional models, more than one image is retrieved from a source of images. In other embodiments of the invention, site images are accessed without the need to download images from a source of images. For example, images are rendered on a display device of a computer system of a user.

Site dimensions are determined at step 2750. Examples of site dimensions include surface geometry, for example, the shape and area of a rooftop. In some embodiments site dimensions include pitch of a surface, for example, pitch of a roof. The site dimensions are determined by analyzing the images obtained in step 2725. In one embodiment of the invention the site dimensions are automatically determined by analyzing the images accessed at step 2725. In other embodiments of the invention site dimensions are determined or provided by a user. The site dimensions are used to generate energy system specifications for the installation site at step 2775.

Figure 5:
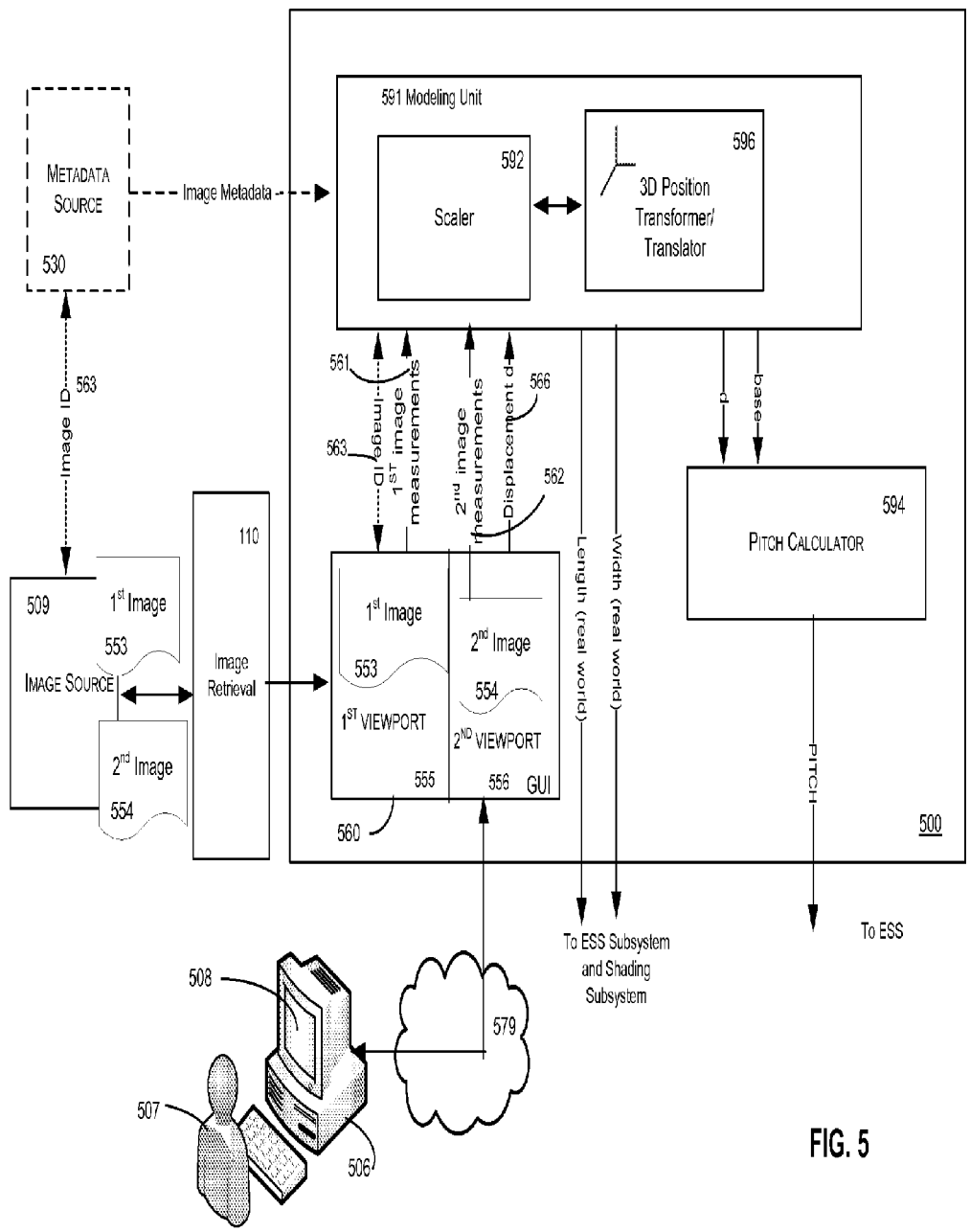
FIG. 5 is a block diagram of a sizing subsystem according to an embodiment of the invention.

FIG. 5 Sizing Subsystem 500

First Embodiment

Once an image of an installation surface is downloaded to system 100 a sizing subsystem 500 is deployed to measure the installation surface. In general dimensions of an installation surface, for example, roof area, are determined by superimposing images representing differing views of the surface. For example, at least two images representing different views of the surface are provided and displayed to a user via a graphical user interface. The user manipulates the images using a mouse, keyboard, cursor, trackball or other means. The images are manipulated such that one image is superimposed on the other. Dimensions are then determined by vector evaluation of image displacement.

FIG. 5 illustrates a remote sizing subsystem 500 according to an embodiment of the invention. Subsystem 500 includes a graphical user interface 560 configured for communication with a computer system 506 accessible by a user 507. GUI 560 is further configured for communication with an image retrieval subsystem such as subsystem 110 illustrated in FIG. 1. GUI 560 provides images for display on display device 508 of user system 506. By interacting with the displayed images, user 507 generates measurements 504 which are provided to a modeling unit 591.

The term 'sizing' as used herein refers to obtaining or generating length and width measurements for a generally rectangular planar installation surface such as a side of a roof. An installation surface is a surface area of a roof, for example a roof side contemplated for installation of energy system components. According to some embodiments of the invention, sizing of an installation surface is carried out by sizing subsystem 500 automatically or at least partly automatically by means of user interaction with a GUI 560 of system 500.

According to one embodiment of the invention the shape of an installation surface is determined by plotting the perimeter of the installable area in a first view comprising a 2d representation of the installable area. The intersection of the plotted points with the plane of the installation surface determines the 3d installation surface perimeter.

Figure 6:
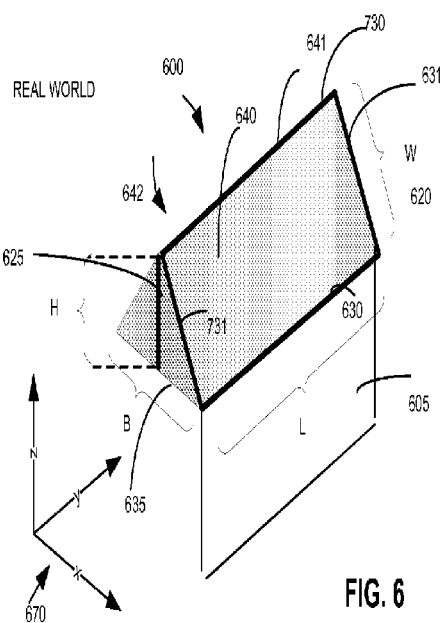
FIG. 6 is a perspective view illustrating dimensions of an example roof selected for installation of an energy system.
Figure 9:
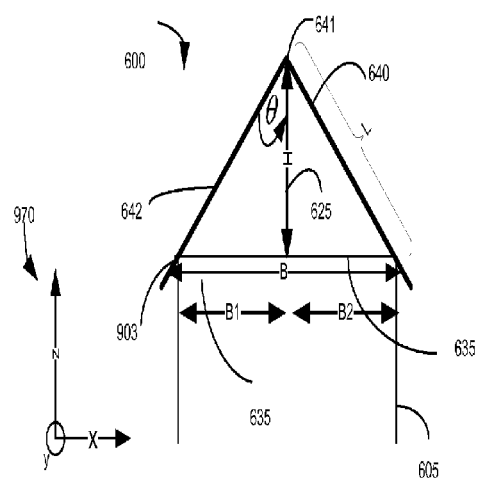
FIG. 9 is a side elevation view of a structure including an installation surface comprising a roof according to one embodiment of the invention.

FIGS. 6 and 9 illustrate respectively a perspective view and a side elevation view of a roof 600. Roof 600 is defined by roof side surfaces 640 and 643 (642 not visible in FIG. 6). As seen in FIG. 6 roof surface 640 is defined by parallel side edges 631 and 731 and parallel side edges 630 and 730. Roof side surfaces 640 and 642 meet to form a roof ridge 641. Roof ridge 641 is elevated with respect to a bottom side surface edge 630. The elevation of roof ridge 641 with respect to bottom edge 630 is represented by dimension H. A roof span of roof 600 is indicated as B. Roof 600 is oriented in FIG. 6 as indicated by axes 670. In FIG. 9 orientation of roof 600 is indicated at 970.

Figure 10:
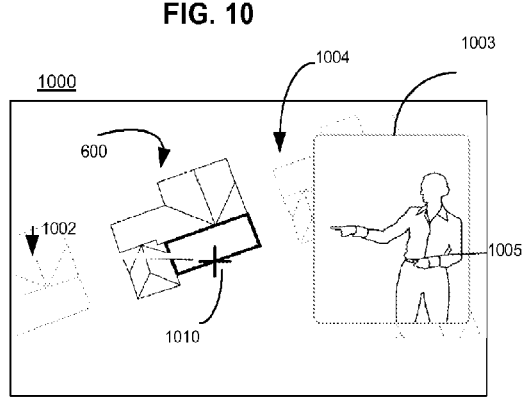
FIG. 10 illustrates a viewport displaying an image of an installation surface according to an embodiment of the invention.

FIG. 10 illustrates a GUI for measuring a roof image according to one embodiment of the invention. A viewport 1000 displays an image including a structure to be sized, for example, a house including a roof 600. In some cases an image presented in viewport 1000 will include roof 600 along with neighboring structures, for example, houses 1002 and 1004. In that case user 507 selects the house, or roof shape, to be sized using a marker, for example cross hair marker 1010.

In the embodiment of the invention illustrated by FIG. 10 an instructional video clip 1003 is displayed on a portion of the user's screen to assist user 507 in interaction with GUI 560 (GUI 560 and user 507 best illustrated in FIG. 5). As illustrated in FIG. 10 a surface area, selectable by marker 1010 representing an installation surface is selectable by user 507 for sizing. Viewport 1000 displays a flat image of a roof which is, in real life, a three dimensional shape. In order to obtain dimensions and pitch for the roof a user selects points on the viewed image to define an installation surface via a GUI. The selected points are provided to modeling unit 591 illustrated in FIG. 5. Referring to FIG. 5, modeling unit 591 develops a description of the three dimensional roof shape based on two dimensional descriptions provided by the user. In some embodiments of the invention, modeling unit 591 relies on image metadata provided by a metadata source 530 to develop the three dimensional description. Image metadata includes image scale information for a displayed image. In one embodiment of the invention the scale information is used to determine, for example, a 'real world' size of a roof based on roof dimensions measured on an image. Metadata includes information such as latitude/longitude, altitude, position of camera, camera focal length etc. Meta data may either be stored in the image itself for example, data stored in an image file, but which is not visible in the displayed image. Metadata may be provided by a separate metadata data source 530 which is cross referenced to a corresponding image, for example by image ID as indicated at 563.

In determining length and width of an image of a surface, sizing subsystem 500 cooperates with a modeling subsystem 591. Modeling subsystem 591 comprises a 3D transform/translation module 596 and a scaler 592. Image transform module 596 generates a transform, or map, for points on a user measured surface. The transform maps points defining the surface shape in one orientation with respect to a reference axis to corresponding points defining the surface shape in any other orientation with respect to the reference axis. Once a transform is generated, points defining a surface shape in, e.g., a perspective view are translatable to corresponding points comprising a side elevation model description of the shape.

A side elevation description includes displacement information, e.g., relative height information. Relative height information is significant, for example, in determining a relative height of a roof ridge with respect to the roof base. Once the relative height is determined, pitch of a roof side is calculated using the height information and width information obtained during sizing.

For example, with reference to FIG. 9, pitch of a roof, is given by rise/run. Run is estimated by determining the horizontal distance (B1) between a gutter edge 903 and a roof ridge 641. Then the elevation (rise) of the ridge 641 above the gutter edge 903 is determined as indicated at H. Once horizontal distance (run B2) and elevation H (rise) are determined, roof angle θ, and thus pitch, is calculated by pitch calculator 504. Therefore a homeowner need not manually measure a real life roof in order to determine appropriate components sizes for an energy system to be installed on the roof.

Returning now to FIG. 5, modeling subsystem 591 translates the points defining the shape to be sized in the viewed orientation of the displayed image (e.g., image in FIG. 6) to points defining the shape to be sized in a side elevation view, for example, as illustrated in FIG. 9. Points defining the shape in the side elevation view provide a scaled real world relative elevation of, for example, a roof ridge 641 with respect to a roof base 635.

Modeling unit 591 is coupled to a pitch calculator 594 to provide a displacement measurement d. For example, a displacement measurement d comprises a measure of z axis displacement of a roof ridge relative to a roof base for a roof base orientation along an x-y axis. Pitch calculator 594 provides pitch information, e.g., pitch of a roof based on the displacement and base information.

Thus sizing subsystem 500 is capable of determining height, width and pitch of an installation without the need for specific views, for example a plan view and an elevation view of a roof surface.

Figure 7:
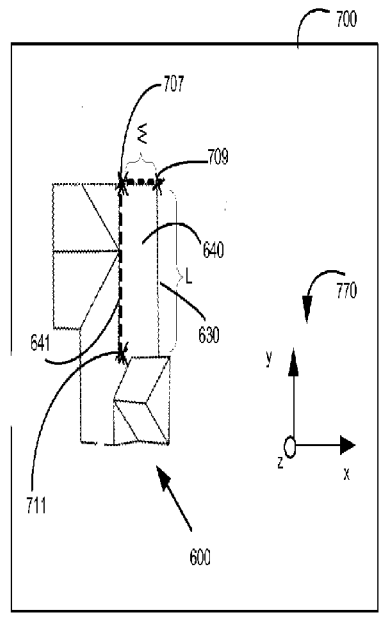
FIG. 7 is a top plan viewport of a roof installation surface illustrating placement of measurement indicia on a roof image according to an embodiment of the invention.

As illustrated in FIG. 5 GUI 560 provides viewports 555 and 556. Viewports 555 and 556 enable user 507 to view 2 dimensional representations, for example 1$^{st}$ and 2$^{nd}$ images 553 and 554, of a three dimensional scene. FIG. 7 illustrates an example viewport 700 displaying a first image of roof 600. Roof 600 is displayed to user 507 on a portion of display device 508 (illustrated in FIG. 5). A surface 640 of roof 600 under consideration for installation of an energy system is displayed within viewport 700. A roof 600 is displayed in viewport 700 at a first orientation with respect to a 3D axis 770. User 507 operates a mouse, trackball, keyboard or other input/output device coupled to user system 506 (illustrated in FIG. 5) to interact with the image in viewport 700. To size installation surface 640 user 507 sets a first position indicator 711, e.g., a cross hair marker, on one corner of installation surface 640 of roof 600. User 507 sets a second indicator 707 on another corner of installation surface 640. User 507 sets a third position 709 by placing a third indicator on another corner of surface 705. First, second and third positions define a length and a width measurement of a rectangle representing dimensions of surface 640. In that manner, first measurements 561 are provided to modeling unit 591 as illustrated in FIG. 5.

In one embodiment of the invention, image scaling module 592 of modeling unit 591 receives the dimensions provided by GUI 560 for an image, for example, image 553. Image scaling module 592 further receives image scale information corresponding to image 553 from an image metadata source 530.

In some embodiments of the invention, image metadata is provided within the image information received from the image source, e.g. image source 509. In that case image retrieval module 110 extracts the image metadata from the received image information. In other embodiments of the invention image metadata is provided by a source other than image source 509. In that case the metadata for respective images is provided to image scaling module 592. In some embodiments of the invention, information identifying an image corresponding to metadata and vice versa (as indicated in FIG. 5 at 563) is included in the image information and the metadata information. In that case the identifying information is used by system 500 to determine corresponding metadata for each displayed image.

Figure 8:
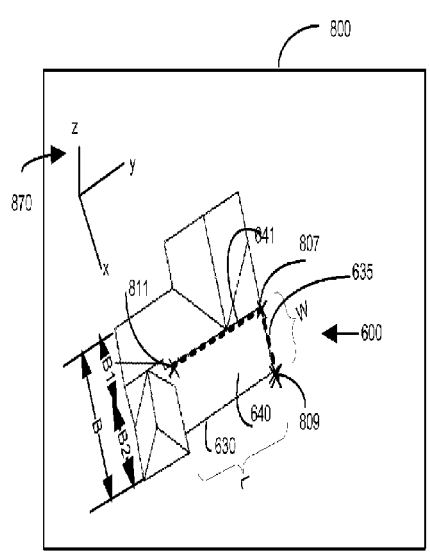
FIG. 8 is a top plan viewport of the installation surface illustrated in FIG. 7 viewed in a different orientation and including measurement indicia according to an embodiment of the invention.

FIG. 8 illustrates a viewport 800 displaying a second image of the roof 600 illustrated in FIG. 6. The second image 600 is displayed at a second orientation 870 with respect to the 3D axis orientation 770 of the first image. User 507 interacts with second image 600 to set first, second and third positions in the second image. User 507 places an indicator, such as a cross hair marker, on corresponding corners 811, 807 and 809 of surface 640 as displayed in the second image 600. Each corner of surface 640 displayed in viewport 800 corresponds to a respective corner of surface 640 displayed in viewport 700. For example corner 711 displayed in viewport 700 corresponds to corner 811 displayed in viewport 800.

As marked by user 507 first, second and third positions (811, 807 and 809) define a length and a width measurement of generally rectangular surface 640. Each measurement is taken with respect to a different axial orientation of surface 640. In that manner 1$^{st}$ and 2$^{nd}$ length and width measurements 562 (best illustrated in FIG. 5) are provided to modeling unit 591 as illustrated in FIG. 5.

In an embodiment of the invention described above, and illustrated in FIG. 5, transform/translator unit 596 comprises a commercially available 3D modeling software package such as AutoCad™. Given points defining a shape in first and second orientations, transform translator unit 596 is capable of describing the shape in any orientation, for example a side elevation view orientation illustrated in FIG. 9. In that manner transform/translator unit 596 provides a measurement H representing displacement of a roof ridge from a roof base.

Second Embodiment

Figure 11:
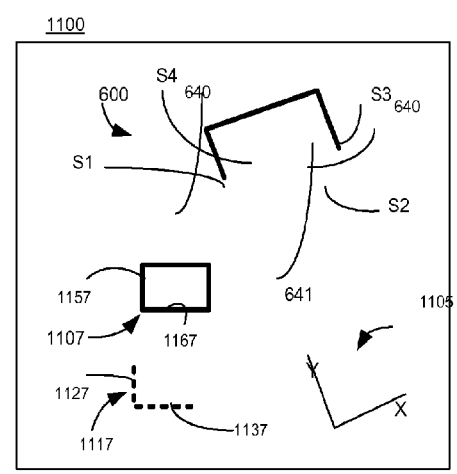
FIG. 11 is a viewport displaying a top plan view of an installation surface and including a measuring tool according to an embodiment of the invention.

An alternative embodiment of sizing subsystem 500 is illustrated in FIGS. 11-19. FIG. 11 illustrates an example GUI displaying a top plan view of a roof image 600 displayed via a viewport 1100. An installation area comprising roof side surface 640 is to be measured. An interactive measuring tool 1107 is displayed in viewport 1100. User manipulation of measuring tool 1107 allows tool 1107 to be positioned with respect to first and second images depicting the same roof 600 from different directions. The measuring tool is rotatable and scalable by user 507 to align with the object, for example a roof side surface 640, to be measured. An alternative embodiment of measuring tool 1107 is illustrated at 1117. Tool 1117 includes side 1137 and side 1127.

In one embodiment of the invention, the dimensions of interactive measuring tool 1107 are calibrated before displaying tool 1107 in viewport 1100. For example, a scale of pixels to feet is determined for image 600 based on metadata for image 600.

The position of interactive measuring tool 1107 within viewport 1100 is adjustable by user interaction with tool 1107 via a mouse, keyboard, trackball or other input/output device. In addition, length of sides 1157 and 1167 are user adjustable. To measure installation surface area 640 user 507 positions measuring tool 1107 over roof 600 in alignment with a side, for example S1, of roof 600. User 507 adjusts the length of a side, for example side 1157, of measuring tool 1107 to correspond in length to the length of side S1 of roof 600. Another side 1167 of measuring tool 1107 is aligned with side S2 of roof 600 and likewise adjusted in length to correspond to the length of side S2 of roof 600.

A roof ridge 641 is marked by user 507 dragging a line tool along ridge 641 within the perimeter of measuring tool 1107. When the ridge line has been drawn, user 507 initiates a reading of dimensions of measuring tool 1107. In addition, an orientation of measuring tool with respect to axes 1105 is determined.

Figure 12:
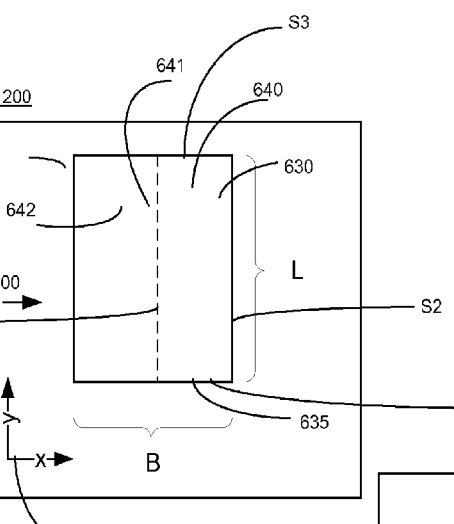
FIG. 12 is a viewport displaying a top plan view of the measuring tool illustrated in FIG. 11.

FIG. 12 illustrates a plan view of a surface, or face of a 3D shape such as a roof image 600 illustrated in FIG. 11. A viewport 1200 displays the image 600 to user 507. The surface shape is defined by a length L, a base B and a ridge line 641 of the displayed image 600. The displayed surface shape is oriented in a reference plane, for example the x-y plane of reference axis 1211. User 507 operates a mouse, trackball, keyboard or other input/output device coupled to user system 506 to interact with the image 600.

To size surface 640 user 507 superimposes sizing tool 1107 or 1117 (best illustrated in FIG. 11) over image 600. User 507 adjusts the dimensions of the tool using a keyboard, mouse, trackball or other input/output device. The dimensions of tool 1107 are adjusted to match a side length of sizing tool (1167) to the length L of image surface 640. Likewise user 507 adjusts a side width 1157 of sizing tool rectangle 1107 to match length B of surface image 600. In that manner user 507 provides a description of shape 600 including length and base measurements and orientation of shape 600 with respect to a reference axis 1211. The description is provided to modeling unit 591 (best illustrated in FIG. 5).

As illustrated in FIG. 5, first image measurements 561 comprising dimensions and orientation of measuring tool 1107 are provided to modeling unit 591 as illustrated in FIG.

5. Modeling unit 591 determines a transform mapping points defining a shape of measuring tool 1107 in a top down orientation of FIG. 11 to a shape of measuring tool 1107 as it would appear in any other orientation of tool 1107 in a 3D space relative to a given axial orientation.

Figure 13:
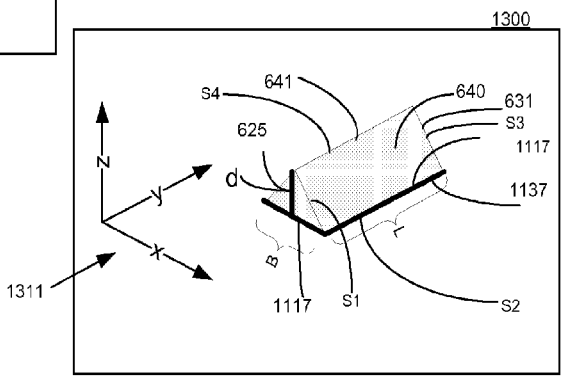
FIG. 13 is a perspective view of the roof illustrated in FIG. 11.

User 507 manipulates measuring tool 1107 (or 1117) to a second viewport 1300, illustrated in FIG. 13. FIG. 13 illustrates a viewport 1300 displaying a perspective image of roof 600 illustrated in FIG. 11. Perspective image of roof 600 is oriented with respect to reference 3D axis 1311. User 507 adjusts tool 1107 (or 1117) with respect to the base B and length L of the perspective image of roof 600.

Manipulation of measuring tool 1107 (or 1117) in 3 dimensions is enabled by transform/translation unit 596 of modeling unit 591, illustrated in FIG. 5. Adjustment of length of any side of measuring tool 1107 (or 1117) causes corresponding adjustment of length of remaining sides of tool 1107 (or 1117). In addition measuring tool 1107 is rotatable in 3 dimensions. FIG. 15 illustrates orientation of measuring tool 1107 in 3 dimensions (X-Axis, Y-Axis, Z-Axis) for alignment with roof image 600 in viewport 1300 illustrated in FIG. 13.

FIG. 16 illustrates placement of measuring tool 1107 (e.g., indicated in FIG. 15) in viewport 1300 (e.g., indicated in FIG. 13) with respect to roof 600. Once placed in an appropriate orientation, side lengths of tool 1107 are adjusted to conform to side lengths of roof 600, as illustrated in FIG. 17. Measuring tool 1107 is positioned in FIG. 17 such that a side of measuring tool 1107 aligns with base b of roof 600. When measuring tool 1107 is positioned as illustrated in FIG. 17, $2^{nd}$ measurements are obtained using measuring tool 1107. In addition information about orientation of measuring tool 1107 with respect to a reference axis (X-Axis, Y-Axis, Z-Axis illustrated in FIG. 16) is provided to modeling tool 1107. Transform/translation unit 596 uses information thus provided, in addition to information provided by scaling unit 592, to determine 'real world' measurements for roof 600.

FIGS. 18 and 19 illustrate measuring tool 1107 as used to measure displacement (d) of a ridge 641 of a roof 600 from a roof base 635. The displacement information is used by modeling unit 591 (FIG. 5) to determine pitch of roof 600. As illustrated in FIG. 18 user 507 displaces measuring tool 1107 in the (Z-Axis) direction from its position illustrated in FIG. 17 to the position illustrated in FIG. 18, i.e., displaced by a distance d from base 635 to ridge 641. FIG. 19 illustrates a difference d between placement of measuring tool 1107 in FIG. 17 and placement of measuring tool 1107 in FIG. 18. The difference measurement d is provided to modeling unit 591. Transform/translation unit 596 determines height H of ridge 641 with respect to base 635 of real world roof 600 (best illustrated in FIG. 9). Once the real world height is known, pitch of the roof is determined.

The description provided above relates to one embodiment of measuring tool 1107. An alternative embodiment of measuring tool 1107 is illustrated in FIG. 11 at 1117. In the embodiment illustrated at 1117 of FIG. 11 only two sides of a measuring tool (one side representing width and one side representing length) are displayed to user 507.

Returning now to FIG. 5, 3D transformer/translation module 596 uses the displacement information to generate a 3D model of roof 600. The model provides a description corresponding to a side elevation view of the same roof 600 including a height dimension d. An example side elevation description is illustrated in FIG. 9.

In one embodiment of the invention scaling unit 592 translates viewport dimensions to real world dimensions. In one embodiment of the invention the real world dimensions are obtained from metadata. The system then tracks changes in the geometry of measuring tool 1107 in relation to the real world dimensions.

In some embodiments of the invention images displayed in a viewport are adjusted to conform to conventions. For example, in one embodiment of the invention images are scaled to ensure x pixels in a displayed image=x feet in a real world imaged object. In another example, an image orientation is adjusted such that a vertical direction (up down) in the real world imaged object corresponds to a selected reference axis, e.g., a Z axis for the image displayed in a viewport.

A simple implementation of installation surface measuring tool 1107 comprises a 2D rectangle with predetermined height and width (equivalent to a 3D box with height=0) overlaid over the image of an object with known magnification/scale/resolution (resolution) and rotation (e.g. 1 pixel=1 foot top-down image). The dimensions (height & width) of the first model can be adjusted to match the dimensions of the object. Since the resolution of the image is known, the real-world dimensions of the object can be calculated. (e.g. A length of 10 pixels on the image could represent 10 feet on the ground).

FIG. 28 illustrates steps of a method for determining pitch of an installation surface. A plan view of an image representing the installation surface is displayed at step 2803. First indicia are positioned about a perimeter of the installation surface image at step 2805. A perspective image of the installation surface is displayed at step 2807. Second indicia are placed about the perimeter of the image of the installation surface. At step 2813 a sizing window is displaced vertically in the perspective to traverse the distance between the base of the installation surface and a ridge of the surface. The displacement is transformed to a height measurement, for example height corresponding to a side elevation view and representing real world height of a roof ridge. Pitch is calculated at step 2817 based on height.

Figure 20:
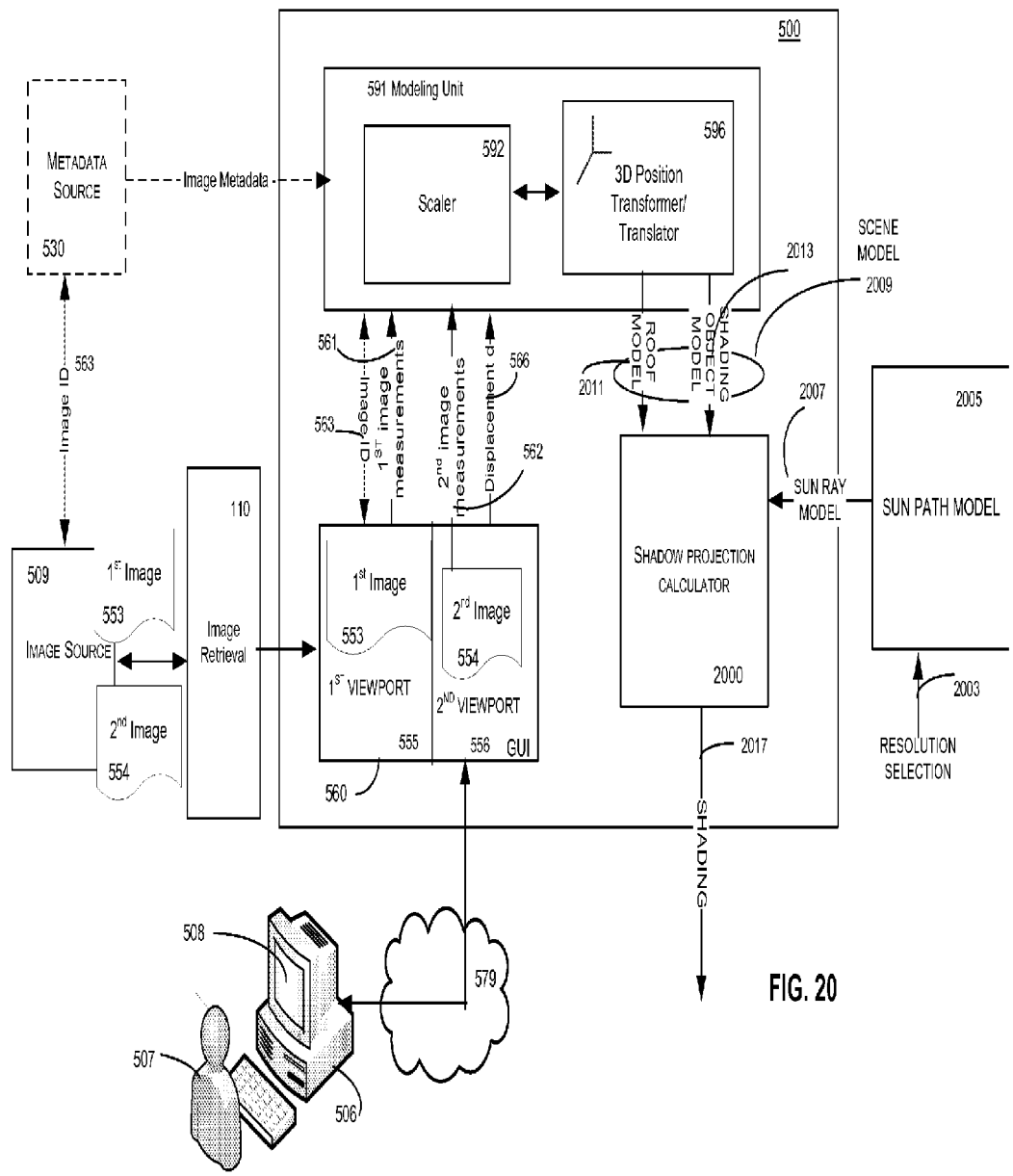
FIG. 20 is a block diagram of a sizing unit configured to provide shading information for an installation surface according to an embodiment of the invention.

FIG. 20 Shading Subsystem

Photovoltaic cells' electrical output is extremely sensitive to shading. When even a small portion of a cell, module, or array is shaded, while the remainder is in sunlight, the output falls dramatically. Therefore embodiments of the invention provide systems and methods that consider shading factors such as trees, architectural features, flag poles, or other obstructions in provisioning a solar energy system.

FIG. 20 illustrates an embodiment of a sizing subsystem 500 configured to determine shading for an installation surface. To determine shading user 507 measures images of shading objects as they appear in viewports together with an installation surface. User 507 sizes shading objects in the same manner as described above for sizing a roof.

Various embodiments of the invention use a plurality of corresponding images (and associated meta-data, where available) of a single structure to determine shading factors. A technique of one embodiment of the invention maps real-world points in a 3d space to images of a structure. Reference shapes comprising two and/or three dimensional shapes are super-imposable onto one or more of these images in a manner similar to that described above for measurement tool 1107 of FIGS. 12-19.

Measurements resulting from the superimposition are used by modeling unit 591 to calculate angles, distances, and relative positions of potential shading objects with respect to an installation surface. In one embodiment of the invention a user is enabled to create and/or manipulate basic shapes, such as measuring tool 1107, to superimpose the basic shapes onto images of the structure obtained by mapping real-world points. In one embodiment of the invention real-world points are referenced to images obtained, for example, from a geographic or geologic database comprising two dimensional and/or three dimensional satellite images of structures such as residential structures.

According to some embodiments of the invention a 3D model of a shading object is constructed by user 507 indicating a first set of perimeter points in a first image of a shading object and indicating a second set of corresponding perimeter points in a second image of the same object. In other embodiments of the invention top-most points of shading objects are identified without indicating perimeter points. In some embodiments of the invention shading objects are created for a scene using 3d primitives or meshes. In some embodiments shading objects are created using Computer Assisted Drawing (CAD) software.

In other embodiments shading objects are created automatically by turning multiple perimeter points from one-or-more viewports into a 3d object/mesh 2013. Modeling unit 591, including scaler 592 and 3D position transformer translator 596, operate on the indicated points in the first and second images (553, 554) in the same manner as described with respect to indicators for installation surfaces. Modeling unit 591 provides a scene model 2009 comprising three dimensional descriptions (roof model 2011) of an installation surface as well as user selected shading objects in the vicinity of the installation surface. A shadow projection calculator 2000 receives the scene model 2009 from the modeling unit 591

In addition shadow projection calculator 2000 receives a sun ray model 2007 form sun path model 2005. In one embodiment of the invention sun path model 2005 comprises a database of sun ray projections by latitude and longitude and by month, year, day and time of day. In one embodiment of the invention boundaries of shadows cast by shading objects on the installation surface are determined by projecting the outline of the shading object onto the installation surface, the lines of projection being parallel to the sun's rays. The direction of the sun's rays relative to the installation surface is determined by comparing the sun ray model to the scene model.

Sun path model 2005 is based upon charts or sun calculators that have been prepared by different organizations. One example of widely available solar diagrams is the Sun Angle Calculator, which is available from the Libby-Owens-Ford Glass Company in the United States. This is a slide rule type of device that will indicate directly the value of H.S.A. and V.S.A. for any time and date during the year at all the latitudes evenly divisible by four between 24 and 52 degrees. The calculator can also be used to estimate the solar irradiation that any sunlit surface can receive on a clear day at any season. Another suitable set of charts is the *Diagrammes Solaires* prepared by the Centre Scientifique et Technique du Bâtiment in France. These charts and an accompanying brochure on how to use them (in French) are available through the Division of Building Research of the National Research Council of Canada or directly from C.S.T.B. in Paris. These are suitable to construct the H.S.A. and V.S.A. for any combination of time, date, latitude and wall orientation.

The position of shadows on the installation surface is determined by reference to scene model 2009. The scene model is oriented in a reference orientation and rotated in a 3D space to simulate the daily rotation of the earth. In that manner scene model 2009 and sun ray model 2007 are configured to simulate a conventional heliodon. A heliodon is a special turntable that causes a physical scene model to move with respect to a reference light source as the real world scene will move with respect to the sun. The model is adjustable for latitude and date. The orientation of the installation surface is taken into account when initiating the model rotation.

Table 1 provides an example shadow calculation useful for implementing embodiments of shadow projection calculator 2000.

TABLE I

Length of Projection in Feet Required to Cast A Shadow 1 Foot High on a Building at 44° North Latitude

| Time | Surface Orientation | | | | | | | |
|---|---|---|---|---|---|---|---|---|
| | South | | 30° East of South | | 60° East of South | | East | |
| (Sundial Time) | 21 May 21 July | 21 March 21 Sept. | 21 May 21 July | 21 March 21 Sept. | 21 May 21 July | 21 March 21 Sept. | 21 May 21 July | 21 March 21 Sept. |
| 8 | 0.14 | 0.97 | 0.83 | 2.04 | 1.29 | 2.56 | 1.41 | 2.40 |
| 9 | 0.30 | 0.97 | 0.73 | 1.53 | 0.95 | 1.68 | 0.93 | 1.39 |
| 10 | 0.39 | 0.97 | 0.62 | 1.24 | 0.69 | 1.18 | 0.57 | 0.80 |
| 11 | 0.43 | 0.97 | 0.51 | 1.02 | 0.45 | 0.81 | 0.27 | 0.37 |
| 12 | 0.45 | 0.97 | 0.39 | 0.84 | 0.22 | 0.48 | — | — |
| 13 | 0.43 | 0.97 | 0.24 | 0.65 | — | 0.16 | — | — |
| 14 | 0.39 | 0.97 | 0.05 | 0.44 | — | — | — | — |
| 15 | 0.30 | 0.97 | — | 0.14 | — | — | — | — |
| 16 | 0.14 | 0.97 | — | — | — | — | — | — |

In addition a variety of graphics programs for visualizing solar shading for proposed building are commercially available and suitable for use in constructing various embodiments of the invention. For example "Visual Sun Chart" is a graphics program useful to determine if access to solar energy for an installation surface.

According to an embodiment of a method of the invention, images are analyzed to determine if there are any objects shading a proposed system at greater than a given angle above the horizon. For example in one embodiment of the invention images are analyzed to determine if there are any objects shading a proposed system at angles between about 5 degrees and 50 degrees between stated points on the azimuth. In another embodiment of the invention images are analyzed to determine if there are any objects shading a proposed system at greater than about a 26 degree angle between stated points on the azimuth.

The shading information thus obtained is used in one embodiment of the invention to determine the level of rebate applicable to a proposed system at that site. In contrast to systems of the invention, conventional systems perform this step manually by a costly on-site visit. A technician uses a tool that measures the geometric angles of objects located in the viewfinder of the tool, facing away from the system to determine shading impact. The techniques of some embodiments of the invention obviate the necessity of such an on-site visit.

TABLE 2

Sun Path Model 2005
Table 2 is an example of data comprising sun path model 2005.

| Time (solar) | Mar 21 and Sept 21 | | June 21 | | December 21 | |
|---|---|---|---|---|---|---|
| 06.00 | 0.0 | −89.6 | 5.4 | −247.1 | 0.0 | −67.2 |
| 08.00 | 29.0 | −81.8 | 32.7 | −250.7 | 20.6 | −58.1 |
| 10.00 | 57.1 | −67.0 | 60.0 | −246.6 | 42.7 | −38.6 |
| 12.00 | 75.9 | 0.0 | 80.3 | −180.0 | 52.9 | 0.0 |
| 14.00 | 57.1 | 67.0 | 60.0 | −113.4 | 42.7 | 38.6 |
| 16.00 | 29.0 | 81.8 | 32.7 | −109.3 | 20.6 | 58.1 |
| 18.00 | 0.0 | 89.6 | 5.4 | −112.9 | 0.0 | 67.2 |

The sun-path model 2005 is a plot of the angular position of the sun as it traverses the sky on a given day. In such a model, the horizontal axis shows the azimuth angle, and the vertical axis shows the altitude angle.

Solar time is the time based on the physical angular motion of the sun. Solar noon is the time when the altitude angle of the sun reaches its peak. Solar time can be calculated from $$t_s = t_l - 4(L_{gs} - L_{gl}) + E_{qt}$$

Where
$t_s$ = solar time,
$t_l$ = local standard time,
$L_{gs}$ = standard local longitude,
$L_{gl}$ = actual longitude, and
$E_{qt}$ = equation of time (min)

FIG. 29 illustrates steps of a method for determining shading for an installation surface. At step 2903 an image of the installation surface is received. At step 2905 dimensions of the surface are determined by measuring the surface as it appears in the image. At step 2907 shading objects appearing in the image are measured. At step 2909 a scene model is generated based on the measurements of the surface and shading objects. At step 2911 sun path data is obtained. At step 2913 the sun path data is used to determine sun ray projection onto the scene model. At step 2915 shading for the surface is determined based on the sun ray projection.

Panel Orientation

One embodiment of the invention accounts for panel orientation in determining sun access of an installation surface. In one embodiment of the invention a solar panel array is mounted at a fixed angle from the horizontal. In other embodiments of the invention a solar panel array is mounted on a sun-tracking mechanism. According to one embodiment of the invention sizing subsystem 500 of a system of the invention is configured to communicate with a source of solar data, for example sun path model 2005. In one embodiment of the invention the source of solar data comprises average high and lows for panels oriented at the same angle as the latitude of major US cities. Sizing module 500 determines a recommended orientation for solar panels based at least in part on the information obtained from the source of solar data 2005.

In one embodiment of the invention a solar panel array is mounted on an installation surface at a fixed angle from the horizontal. In other embodiments of the invention a solar panel array is mounted on a sun-tracking mechanism.

Figure 21:
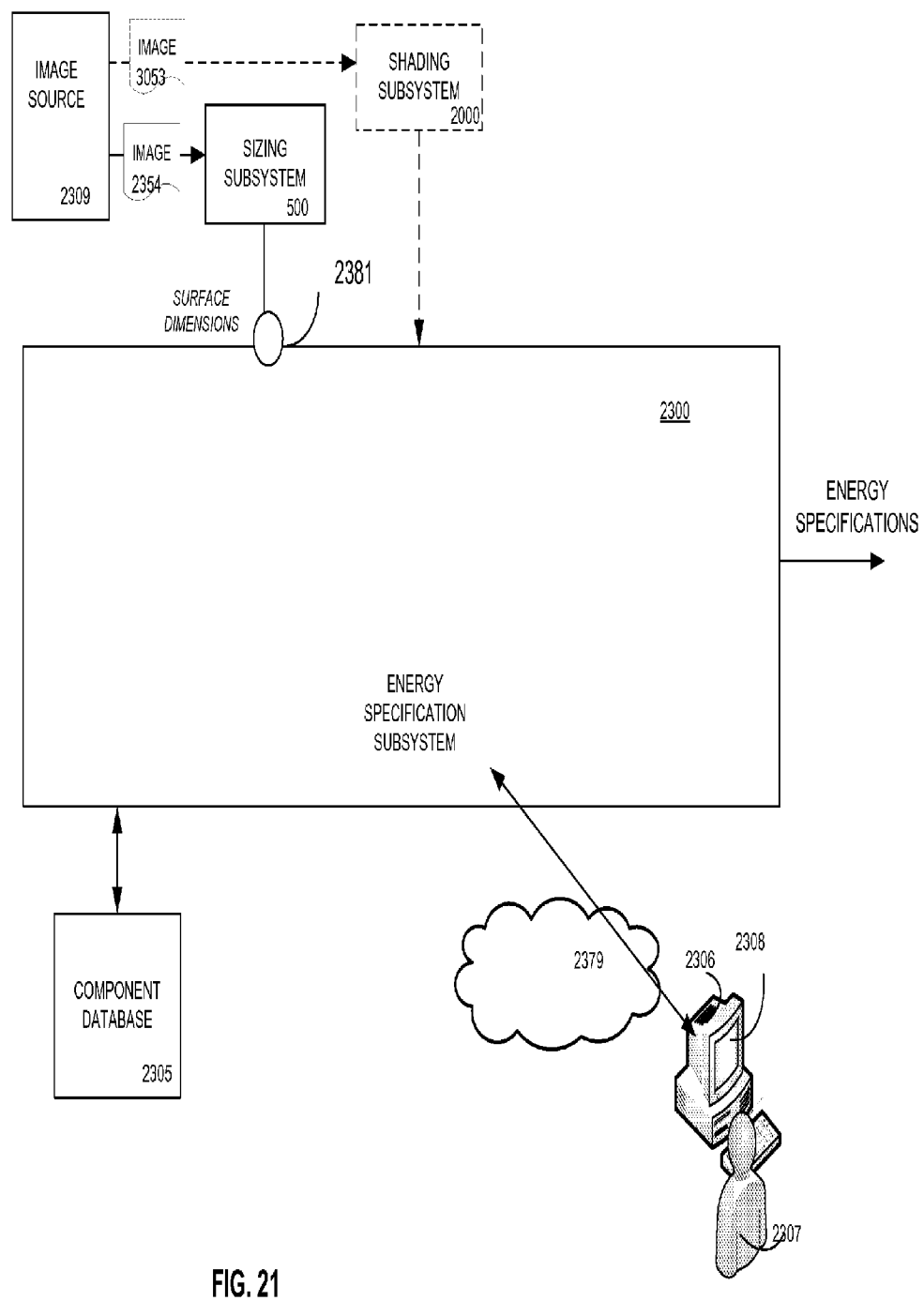
FIG. 21 is a block diagram of an energy specification subsystem according to an embodiment of the invention.

FIG. 21 Generating Energy System Specifications

One example embodiment of the invention generates energy system specifications customized for a user selected installation site. Energy system specifications relate to energy generating capacity of a selected site. For example for installation of a solar energy system, a roof surface is evaluated to determine energy related parameters, such as available installation area, orientation of the installation surface with respect to the sun, and the effects of shading objects on the installation surface. A total maximum energy generating capacity of the roof is determined based on the parameters and based on the energy generating characteristics of available solar system components.

FIG. 21 is a block diagram of an energy system specification (ESS) generator 2300 according to an embodiment of the invention. ESS generator 2300 receives surface dimension information related to a site at input 2381. In one embodiment of the invention input 2381 is provided with sizing information, for example, from sizing subsystem 500. Sizing information can include, for example, surface area available for installation, shape of the available area, slope of the area, and other information related to the installation site.

ESS generator 2300 provides energy system specifications for a site based on the surface dimension information for the site. Energy system specifications comprise information for determining suitable energy system components for installation on a site to be provisioned. For an example site comprising a rooftop, ESS generator 2300 determines energy per square foot of roof surface.

In one embodiment of the invention, ESS generator 2300 determines an amount of energy which is potentially generated by each installable surface area of an installation site. In one example embodiment, energy potentially generated is given by:

Surface Area×Solar Insulation×Energy reduction due to pitch & azimuth=Potential Solar Energy.   Eq. 1

Wherein surface area is an amount of surface area in square meters (or equivalent) and solar Insulation is the amount of solar energy radiation received, typically measured as "kilowatt hours per year per kilowatt peak rating".

In one embodiment of the invention solar insulation is calculated based on data in a solar insulation database (not shown). In that embodiment user-provided location information 900 (illustrated in FIG. 2) is used to search the insulation database for a solar insulation data associated with the site selected for installation. The insulation calculations are carried out in one embodiment of the invention using the energy system specifications generated by energy system specification subsystem 2300 to correspond to installation surface dimensions provided by sizing subsystem 500. In other embodiments of the invention energy system specification subsystem 2300 calculates insulation based on local electric costs determined by reference to a database such as Residential Energy Consumption database 117 (illustrated in FIG. 1).

Returning now to FIG. 21, in one embodiment of the invention ESS generator 2300 provides specifications for a site based on site's latitude and longitude. In one embodiment of the invention the calculation accounts for pitch & azimuth information received from sizing subsystem 500. As used herein the term 'azimuth' refers to an angle with respect to North. In some practical implementations of energy systems, energy output of an installed energy system is reduced due to pitch & azimuth considerations.

In one embodiment of the invention a combination of tilt of a slope compared to "flat" and the azimuth of the slope is determined by system 2300 based on information provided by sizing subsystem 500. The energy received by a surface is reduced by this determination. An amount of the reduction amount is calculated automatically in one embodiment of the invention.

In another embodiment of the invention the reduction amount is calculated by reference to a suitable database containing standard reference tables. In one embodiment of the invention ESS generator 2300 identifies a model site with characteristics similar to the site under evaluation by ESS generator 2300. A dataset for the model site is adjusted to match as closely as possible the characteristics of the site under consideration by ESS generator 2300. For example, if a site under consideration by ESS generator 2300 is twice as big as a model site and at the same tilt & azimuth, then ESS generator 2300 multiplies the Energy System Specification parameter "energy output" by 2 for the site under consideration. In one embodiment of the invention ESS generator 2300 is provided with shading information from a shading subsystem 2000. Shading information is provided for the surface for which specifications are to be generated. Shading effects are expressed as energy per square foot of surface area in one embodiment of the invention.

In some embodiments of the invention ESS subsystem 2300 receives information about home energy consumption related to the consumer's residence from a source of residential energy consumption, for example, Residential Energy Consumption database 117 illustrated in FIG. 1. ESS generator 2300 adjusts an energy system specification based on the home energy consumption information. For example, if home energy consumption is lower than the potentially generated energy, the system specifications may be adjusted such that a system with a lower than maximum possible energy output is defined.

One embodiment of the invention provides for automatic selection of energy system components based on energy system specifications provided by ESS generator 2300. For example, specifications for energy system components are stored in a component database 2305. ESS generator 2300 is configured to communicate with component database 2305. ESS generator 2300 compares energy system specifications stored in the database with specifications for energy system components for a site.

FIG. 25 is a flowchart illustrating steps of a method for generating energy system specifications according to an embodiment of the invention. At step 2501 an image including a surface upon which an energy system is to be installed is received. At step 2503 pitch of the installation surface is determined by measuring the surface as it appears in the image. At step 2505 dimensions of the installation surface are determined by measuring the surface as it appears in the image. At step 2507 compass orientation of the installation surface is determined. In one embodiment of the invention compass orientation is determined by analyzing the image of the surface. In other embodiments of the invention compass orientation is determined using metadata associated with the image.

In an optional step 2509, shading information for the installation surface is calculated based on the image of the surface including shading objects impacting the installation surface. Maximum energy generating capacity of the installation surface is determined by accounting for the pitch, surface dimensions, surface orientation and shading in determining insulation of the surface. In some embodiments of the invention energy generating capacity is calculated considering energy generating capacity of selected energy system components. In one embodiment of the invention energy generating capacity is expressed as KW per square foot.

Components

Figure 22:
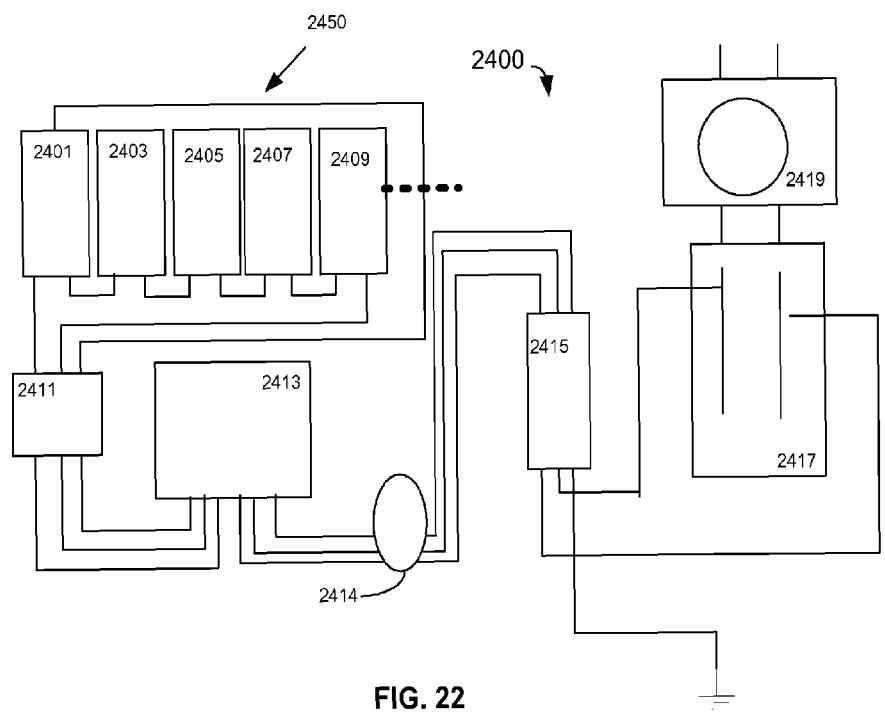
FIG. 22 is a block diagram of an example solar energy system including system components according to an embodiment of the invention.

FIG. 22 illustrates an example solar energy system 2200 including typical components. Information about the components of energy system 2200 are stored in component database 2405 of system 2400 (system 2400 illustrated in FIG. 24). System 2200 comprises an array 2450 of solar panels 2401-2409. Panels 2401-2409 are connected through a DC disconnect 2411 to an inverter 2413. Inverter 2413 is connected through a meter 2414 to an AC service Entrance 2417. AC service entrance 2417 is connected through utility meter 2419 to a conventional energy grid.

Table 1 provides example specification information for commercially available solar system components.

TABLE 1

| Model | XW6048-12/240-60 | XW4548-120/240-60 | XW4024-120/240 |
|---|---|---|---|
| Part Number | 705200 | 705201 | 705202 |
| Price | $4500.00 | $3950.00 | $3950.00 |
| Output Power (Watts) | 6000 | 4500 | 4000 |
| Surge rating (10 seconds) | 1200 | 900 | 800 |
| Efficiency - CEC weighted | | 95% | |
| CEC power rating | 5752 W | 4500 W | 4000 W |
| DC Current at rated power | 130 A | 96 A | 178 A |

Figure 24:
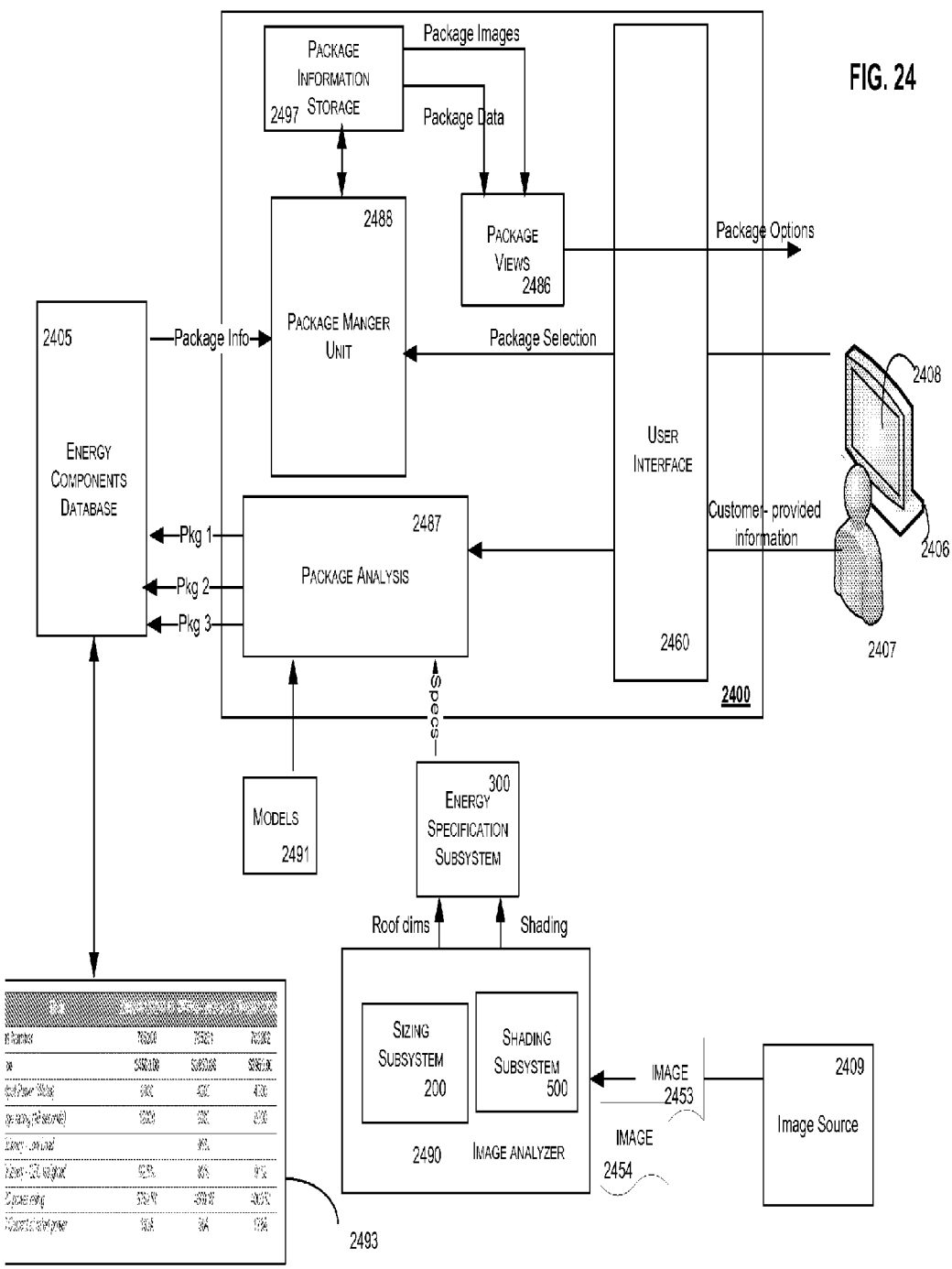
FIG. 24 is a block diagram of a quote subsystem according to an embodiment of the invention.

FIG. 24 Quoting System

FIG. 24 illustrates a quoting subsystem 2400 according to an embodiment of the invention. Quoting subsystem 2400 comprises a user interface module 2460 configured for communication with a computer system 2406 of a user 2407. In some embodiments of the invention user 2407 is a potential purchaser of an energy system. For example user 2407 is a homeowner interested in purchasing a solar energy system for installation on a roof of a home. In other embodiments of the invention, user 2407 is third party provider of solar energy systems. In that case user 2407 interacts with quoting system 2400 to provide quotes to, for example, commercial enterprises, government agencies and other parties interested in procuring a solar energy system for installation on a site. User interface module 2460 is coupled to a package analysis module 2487, a package manager unit 2488, and a package view unit 2486.

In one embodiment of the invention a visual image of the customer's roof is displayed along with a pre-determined system of an average size. A consumer is then enabled to 'drag and drop' solar panels, and in some embodiments other components, on and off of the displayed image. Some embodiments of the invention enable a consumer to scale the system up and down in size using a mouse, keyboard or other input device. Such embodiments enable consumers to increase and decrease the size of the system to suit the consumer's aesthetic and economic preferences. Some embodiments of the invention automatically adjust in real-time the on-screen display of the package information including cost, economic and environmental outputs in accordance with each 'drag and drop' adjustment.

In that manner embodiments of the invention enable a consumer to engineer a custom solar system remotely. An energy specification subsystem 300 is coupled to package analysis module 2487 and to an image analyzer system 2490. Image analyzer system 2490 is coupled to a source 2409 of images 2453, 2454. A model storage unit 2491 is coupled to package analyzer 2487. Model storage unit 2491 stores reference packages comprising, for example, packages comprising a variety of predetermined package configurations including commonly used component sizes.

Package analyzer 2487 is coupled to an energy components database 2405. Energy components database 2405 stores specifications, including cost of energy system components. An example energy system component specification is illustrated at 2493. Package information comprising information related to components selected to comprise a package is provided from energy components database 2405 to package manger unit 2488. Package manager unit 2488 stores package information in a package information storage unit 2497. According to one embodiment of the invention package information storage unit 2497 stores images and package information related to package components. Package view unit 2486 provides images of assembles packages for display as purchase options on display device 2408 of system 2406 to user 2407.

Figure 23:
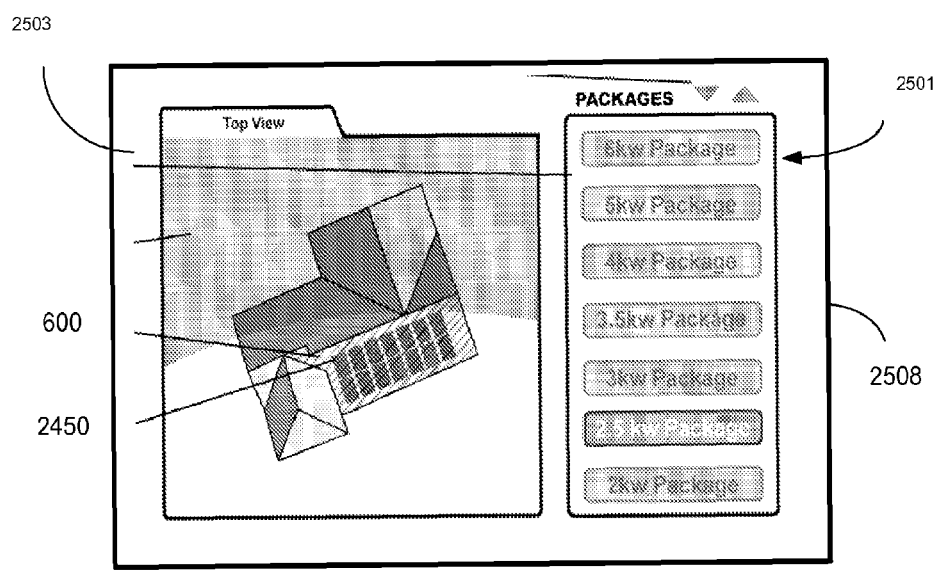
FIG. 23 illustrates a display screen providing an image of a user selected installation surface including an installed energy system and providing information related to the installed energy system.

As illustrated in FIG. 23 systems and methods of the invention provide a displayed image 2503 of a customer engineered solar PV system 2450 as the system appears on the customer's roof 600. In one embodiment of the invention, user selectable packages 2501 are displayed with the image of the customer's roof. Selection of a package option will cause the displayed image of the customer's roof to change the solar PV system image to correspond to a selected package.

In one embodiment of the invention a quote for the displayed system is provided in association with the image of the system. According to some embodiments of the inventions the system also displays economics and environmental information about a selected package option. Economic and environmental information include such factors as: energy produced, cost of the system and rebate, electricity cost reduction, payback period, CO2 tons avoided, etc. In one embodiment of the invention economic and environmental information is displayed on-screen with the selectable package configurations illustrated at 2501 in FIG. 23. Embodiments of the invention are configured to communicate with databases, for example databases of third-party data providers, comprising electricity data, solar output data, geographic photographic data, and subsidy data. Accordingly the invention provides a comprehensive online solution for consumers interested in investigating the benefits of a solar PV system.

In one embodiment of the invention, user interface module 2460 of system 2400 illustrated in FIG. 24 communicates with user system 2406 via a communications link such as the internet to receive user provided information. The user provided information includes a location of a site to be provisioned with an energy system. The location information is provided to a package analyzer 2487. Also provided to package analyzer 2487 is an energy system specification for the site location provided by user 2407.

In some embodiments of the invention sizing subsystem 200 (also illustrated in FIG. 1 at 500) receives energy consumption data related to the user specified location, from a source of energy consumption data 117 (illustrated in FIG. 1). According to some embodiments of the invention sizing module 200 receives user provided system criteria information from user system 2406, for example, a percentage of total energy user 2407 desires to supply using a solar energy system. Based on the information about energy consumption received from database 117 and the desired energy production of a solar energy system as indicated by user 2407, and further on the energy specification provided by energy specification subsystem 300, package analyzer 2487 determines at least one package comprising components matching the criteria as closely as possible.

FIG. 26 illustrates steps of a method for quoting energy systems according to an embodiment of the invention. At step 2601 site dimensions are received, for example, from a sizing subsystem such as subsystem 500 illustrated in FIG. 1. At step 2611 energy specifications are generated for the site based on the site dimensions. The specifications are generated, for example, by an energy system specification generator such as generator 2300 illustrated in FIG. 21. At step 2613 components are automatically selected from a component database based on the site dimensions and the energy system specifications. In cases where a plurality of possible component configurations are suitable for meeting an energy system specification, a plurality of package options comprising various arrangements of suitable energy system components are determined. The package options are displayed on a display device of potential system buyer at step 2621.

At step 2623 a package selection is received from a potential system buyer indicating one of the plurality of displayed packages. Once a package selection is received systems and methods of the invention display information about the selected package including, for example, cost and energy savings. In one embodiment of the invention the step of obtaining site dimensions at 2601 is carried out by receiving information about the site location at step 2603. At step 2605 an image is selected, for example, from a source of geographical images. The selected image is analyzed at step 2607 to determine site dimensions.

According to one embodiment of the invention the step 2613 of selecting components to comprise a package is carried out by calculating component sizes based on system specifications at step 2615. Packages are configured based on the calculated component sizes at step 2617. The packages are displayed to a customer at step 2619.

As illustrated in FIG. 24, a package manager unit 2488 receives package information from package analysis unit 2487 and stores the information in package information storage 2497. Package manager unit 2488 receives package selection and other information from user 2407 via GUI 2460. In one embodiment of the invention package manager unit 2488 provides package views to a user 2407 while enabling user 2407 to interact with package manager 2497 to customize a system to the user's preferences.

In one embodiment of the invention economic and environmental information is provided to a display screen, 2408 of user system 2406. The information is displayed in a first portion of display screen 2408 while information related to suitable packages is displayed in a second portion of display screen 2408.

As illustrated in FIG. 1, embodiments of the invention are configured to communicate with databases, for example databases of third party data providers, comprising electricity data, solar output data, geographic photographic data, and subsidy data. Accordingly the invention provides a comprehensive online solution for users to investigate the benefits of an energy system.

One embodiment of the invention remotely determines the feasibility of installing a solar energy system as a preliminary step to configuring a package. One embodiment of the invention automatically considers site access and other engineering issues in assessing feasibility. One embodiment of the invention remotely determines the presence of shading objects above a given angel of incidence and accounts for these objects in determining feasibility and in selecting package components. One embodiment of the invention automatically selects the optimal roof and roof portions upon which to locate PV panels for optimal photovoltaic performance. One embodiment of the invention determines a maximum system size that can be configured to fit on an optimal roof area.

Figure 30:
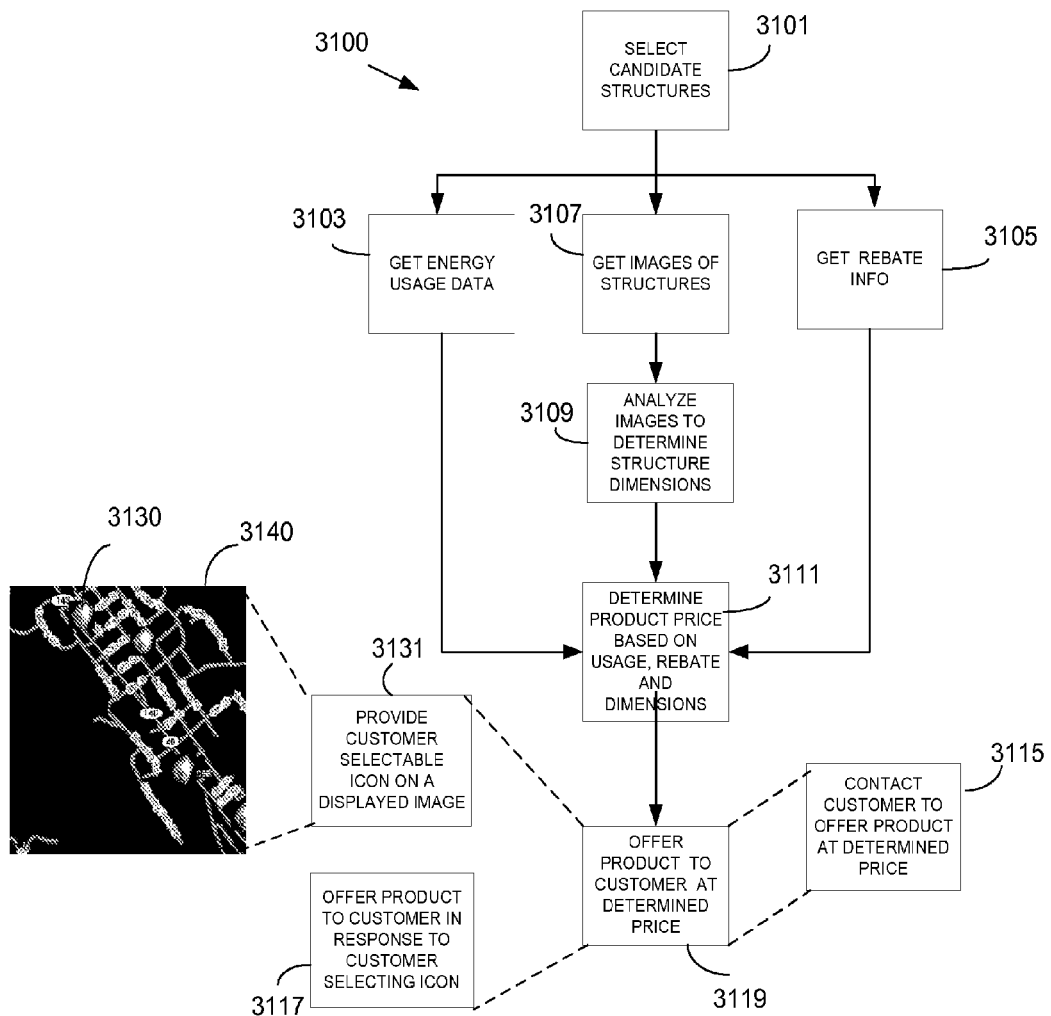
FIG. 30 is a flowchart illustrating steps of a method for configuring component packages according to an embodiment of the invention.

FIG. 30 illustrates steps of a method for providing a quote to a potentially purchaser of an energy system according to one embodiment of the invention. At step 3101 candidate structures are selected for installation of solar energy system packages. For each candidate structure energy usage data is determined at step 3103. For each candidate structure an image of the structure is obtained at step 3107. Also for each structure rebate information is obtained at step 3105.

At step 3109 the images are analyzed to determine structure dimensions such as surface area and pitch. The dimensions are used in calculating the size of components to comprise an energy system for the structure. At step 3119 a system is offered to a customer for a candidate structure. In one embodiment of the invention a system offer is displayed on a display device for viewing by a customer. A selectable icon is provided enabling the customer to select the displayed offer for purchase at 3117. In one embodiment of the invention the customer is contacted to offer the system for a candidate structure at an automatically determined price.

In one embodiment of the invention the displayed offer includes information about the offered system package or packages. Information is selected from a variety of information types for example, information may include indications of a cost of a package and indications of energy savings expected to be realized by a particular offer.

There have thus been provided new and improved methods and systems for provisioning a solar energy system. While the invention has been shown and described with respect to particular embodiments it is not thus limited. Numerous modifications, changes and enhancements will now be apparent to the reader. All of these variations remain within the spirit and scope of the invention.

We claim:

1. A system for measuring a real world structure to be provisioned with solar panels using images including the real world structure, the system comprising:
   a display unit configured to display a first image and a second image including the real world structure;
   metadata for the first image representing a scale of the first image with respect to the real world;
   a displayable, user-adjustable measuring tool capable of providing measurements adequate for installing a solar panel, the measuring tool calibrated in accordance with the scale such that user adjustment of the measuring tool with respect to the displayed first and second images of the real world structure provides a measurement of the real world structure, wherein the user adjustment of the measuring tool includes at least one of positioning, rotating, and scaling the measuring tool to match at least a portion of the real world structure in both the displayed first and second images when the adjusted measuring tool is superimposed over the real world structure in the displayed first and second images, wherein the second image is of a different direction than the first image.

2. The system of claim 1 wherein the displayed first and second images including the real world structure include a roof of the real world structure and wherein the measuring tool is operable to measure an area of at least a portion of the roof.

3. The system of claim 1 wherein the displayed first and second images including the real world structure include a roof of the real world structure and wherein the measuring tool is operable to measure pitch of the roof.

4. The system of claim 1 further comprising:
   a source of images of real world structures, wherein the system is configured to receive and display selected images of the real world structure from the source of images;
   a source of corresponding scale information for the images, the system configured to receive corresponding scale information for at least one of the selected images; and
   the measuring tool calibrated in accordance with the received corresponding scale information.

5. The system of claim 4 further comprising an image acquisition unit including an input for receiving structure location information from a user, the image acquisition unit selecting the first and second images of the real world structure from the source of images based on the received structure location information.

6. The system of claim 5 wherein the image acquisition unit includes an input for receiving the structure location information from a user computer system via the Internet.

7. The system of claim 1 further comprising:
   a specification unit communicating with the measuring tool;
   a source of energy consumption information for the real world structure, communicating with the specification unit; and
   the specification unit providing specifications for the solar panels based on information received from the source of energy consumption information and the measurement of the real world structure provided by the measuring tool.

8. The system of claim 7 further comprising a source of solar panel information configured to communicate with the specification unit to provide information about selected solar panels for installation on the real world structure, the information selected based at least in part on the specifications.

9. The system of claim 8 wherein the information provided by the source of solar panel information includes an image of the selected solar panels and wherein the image is provided to the display unit for superimposed display with the displayed first and second images of the real world structure.

10. The system of claim 1 wherein the measuring tool further comprises at least one displayed length-adjustable line segment extendable along a roof edge of the real world structure to measure a length of the roof edge.

11. The system of claim 1 wherein the displayed first and second images of the real world structure include an image of a roof and wherein the adjustable measuring tool comprises two line segments and wherein adjustment by a user of a length of one of the two line segments results in an automatic corresponding adjustment of the other of the two line segments in accordance with the scale, such that the user is enabled to measure an area of the roof by adjusting the measuring tool.

12. A method for measuring a real world structure for installation of solar panels comprising:
   displaying a first image of the real world structure on a display device;
   providing an interactive measuring tool capable of providing measurements adequate for installing a solar panel for display on the display device;
   displaying the interactive measuring tool on the display device;
   enabling a human operator to manipulate the interactive measuring tool with respect to the displayed first image of the real world structure to indicate a dimension of the real world structure displayed in the first image, wherein manipulating the measuring tool includes at least one of positioning, rotating, and scaling the measuring tool to match at least a portion of the real world structure when the adjusted measuring tool is superimposed over the real world structure in the displayed first image;

displaying a second image of the real world structure on the display device;

enabling the human operator to manipulate the interactive measuring tool with respect to the displayed second image of the real world structure such that the measuring tool also matches the portion of the real world structure when the adjusted measuring tool is superimposed over the real world structure in the displayed second image, wherein the second image is of a different direction than the first image; and providing a measurement of the real world structure based on the manipulation of the measuring tool with respect to the displayed first and second images.

13. The method of claim 12 wherein enabling the human operator to manipulate the interactive measuring tool to indicate the dimension comprises enabling the human operator to align the interactive measuring tool along a roof edge in the displayed first and second images of the real world structure.

14. The method of claim 12, further comprising receiving scale information for at least one of the first and second images of the real world structure, and wherein providing a measurement is carried out based, at least in part, on the received scale information and at least in part on the indicated dimension of the real world structure displayed in the first and second images.

15. The method of claim 12 further comprising automatically determining components to comprise an installed solar energy system based, at least in part on the provided measurement.

16. The method of claim 15 further comprising receiving energy use information for the real world structure, and wherein automatically determining components is based at least in part on the measurement of the real world structure and at least in part on the received energy use information for the real world structure.

17. The method of claim 15, further comprising enabling the human operator to manipulate the interactive measuring tool to measure roof pitch.

18. A method for rapidly provisioning a real world structure with solar panels comprising:

receiving structure location information from a first human operator system;

selecting a first image and a second image of the real world structure for display to a second human operator on a first display device;

displaying an interactive measuring tool capable of providing measurements adequate for installing a solar panel on the first display device and enabling the second human operator to generate the measurements of the real world structure adequate for installing the solar panel by manipulating the displayed interactive measuring tool with respect to the displayed first and second images of the real world structure, wherein manipulating the measuring tool includes at least one of positioning, rotating, and scaling the measuring tool to match at least a portion of the real world structure when the adjusted measuring tool is superimposed over the real world structure in both of the displayed first and second images, wherein the second image is of a different direction than the first image; and evaluating the real world structure for provisioning with the solar panels based, at least in part on the measurements.

19. The method of claim 18, further comprising displaying an image of the real world structure to the first human operator system on a second display device.

20. The method of claim 18, further comprising receiving energy consumption information from the first human operator system and evaluating the real world structure for provisioning with the solar panels based, at least in part, on the energy consumption information.

* * * * *